(12) United States Patent
Yamada et al.

(10) Patent No.: US 12,167,127 B2
(45) Date of Patent: Dec. 10, 2024

(54) IMAGING APPARATUS AND ELECTRONIC EQUIPMENT

(71) Applicant: SONY SEMICONDUCTOR SOLUTIONS CORPORATION, Kanagawa (JP)

(72) Inventors: Satoshi Yamada, Kanagawa (JP); Hiroyuki Ozawa, Kanagawa (JP); Hitoshi Kai, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/754,711

(22) PCT Filed: Oct. 8, 2020

(86) PCT No.: PCT/JP2020/038173
§ 371 (c)(1),
(2) Date: Apr. 8, 2022

(87) PCT Pub. No.: WO2021/075352
PCT Pub. Date: Apr. 22, 2021

(65) Prior Publication Data
US 2024/0080546 A1    Mar. 7, 2024

(30) Foreign Application Priority Data
Oct. 18, 2019  (JP) .................................. 2019-191414

(51) Int. Cl.
*H04N 23/65*   (2023.01)
*G06V 10/774*  (2022.01)
(Continued)

(52) U.S. Cl.
CPC ......... *H04N 23/651* (2023.01); *G06V 10/774* (2022.01); *G06V 10/82* (2022.01);
(Continued)

(58) Field of Classification Search
CPC ...... H04N 23/651; H04N 25/78; H04N 23/81; H04N 23/611; H04N 5/2628; G06V 10/82; G06V 10/774
(Continued)

(56) References Cited

U.S. PATENT DOCUMENTS

| 7,609,297 B2* | 10/2009 | Master | G06F 9/3897 |
| | | | 702/29 |
| 2004/0252139 A1* | 12/2004 | Takizawa | G06T 3/606 |
| | | | 348/E5.111 |

(Continued)

FOREIGN PATENT DOCUMENTS

| JP | 2004-333957 A | 11/2004 |
| JP | 2009-267792 A | 11/2009 |
| WO | 2018/051809 A1 | 3/2018 |

OTHER PUBLICATIONS

International Search Report and Written Opinion of PCT Application No. PCT/JP2020/038173, issued on Dec. 15, 2020, 08 pages of ISRWO.

*Primary Examiner* — Sath V Perungavoor
*Assistant Examiner* — Kristin Dobbs
(74) *Attorney, Agent, or Firm* — CHIP LAW GROUP

(57) ABSTRACT

Signal processing is performed using a built-in memory. An imaging apparatus includes: a pixel array unit that includes a plurality of pixels performing photoelectric conversion; a converter that converts an analog pixel signal output from the pixel array unit into digital image data; an image processing unit that performs image processing on the digital image data; and a storage unit that includes a plurality of regions for which a power distribution state is able to be selectively designated, and stores at least the digital image data output by the image processing unit.

16 Claims, 20 Drawing Sheets

(51) Int. Cl.
  *G06V 10/82*    (2022.01)
  *H04N 5/262*    (2006.01)
  *H04N 23/611*   (2023.01)
  *H04N 23/81*    (2023.01)
  *H04N 25/78*    (2023.01)

(52) U.S. Cl.
  CPC ......... *H04N 5/2628* (2013.01); *H04N 23/611* (2023.01); *H04N 23/81* (2023.01); *H04N 25/78* (2023.01)

(58) Field of Classification Search
  USPC .......................................................... 348/77
  See application file for complete search history.

(56)         References Cited

U.S. PATENT DOCUMENTS

| | | | |
|---|---|---|---|
| 2019/0204448 A1* | 7/2019 | Eki ........................ | H04N 23/62 |
| 2020/0053299 A1* | 2/2020 | Zhang .................... | H04N 25/40 |
| 2022/0417542 A1* | 12/2022 | Jeong ...................... | G06T 1/60 |

* cited by examiner

IMAGING APPARATUS AND ELECTRONIC EQUIPMENT

CROSS REFERENCE TO RELATED APPLICATIONS

This application is a U.S. National Phase of International Patent Application No. PCT/JP2020/038173 filed on Oct. 8, 2020, which claims priority benefit of Japanese Patent Application No. JP 2019-191414 filed in the Japan Patent Office on Oct. 18, 2019. Each of the above-referenced applications is hereby incorporated herein by reference in its entirety.

TECHNICAL FIELD

The present disclosure relates to an imaging apparatus and electronic equipment.

BACKGROUND ART

In recent years, various kinds of signal processing have been required to be performed at a high speed on image data captured by image sensors. Also, semiconductor devices in which a plurality of chips such as image sensor chips, memory chips, and signal processing chips are connected by bumps into packages and semiconductor devices in which dies including image sensors disposed therein and dies including memories, signal processing circuits, and the like disposed therein are laminated into packages have been proposed with development of semiconductor process technologies.

In a case in which semiconductor devices incorporating image sensors and signal processing circuits (hereinafter, referred to as imaging apparatuses) are mounted in electronic equipment such as smartphones, the signal processing circuits in the imaging apparatuses perform various kinds of signal processing in response to commands from application processors mounted in the electronic equipment in many cases.

CITATION LIST

Patent Literature

[PTL 1]
WO 2018/051809 A1

SUMMARY

Technical Problem

Since application processors include hardware performance that enables advanced signal processing to be performed at higher speeds than signal processing circuits in the imaging apparatuses in many cases, the signal processing circuits in the imaging apparatuses typically perform signal processing in response to commands from the application processors. For example, recognition processing and the like have been realized using dynamic random access memories (DRAMs) externally provided at application processors including digital signal processors (DSPs) mounted therein.

However, substrate areas for mounting the DRAMs are needed, it is also necessary to cause the application processors to operate in a case in which recognition processing is performed, and there are thus problems such as high power consumption of the entire systems and high hacking risks of the external DRAMs.

Thus, the present disclosure provides an imaging apparatus and electronic equipment capable of performing signal processing using built-in memories.

Solution to Problem

According to an embodiment, an imaging apparatus may include: a pixel array unit that includes a plurality of pixels performing photoelectric conversion; a converter that converts an analog pixel signal output from the pixel array unit into digital image data; an image processing unit that performs image processing on the digital image data; and a storage unit that includes a plurality of regions for which a power distribution state is able to be selectively designated and stores at least the digital image data output by the image processing unit.

The image processing unit may execute processing of enlarging, reducing, or trimming the digital image data.

The image processing unit may execute distortion correction processing for the digital image data. In this manner, the image processing unit may execute processing for conversion into image data suitable for various kinds of signal processing.

The imaging apparatus may further include: a control unit that switches the power distribution state for each of the regions in the storage unit.

The imaging apparatus may further include: an image rotation unit that acquires data obtained by rotating the digital image data stored in the storage unit, and the storage unit may further store digital image data output by the image rotation unit. In this manner, pre-processing may be performed by rotating the image data.

The image rotation unit may rotate the digital image data by a predetermined angle. Processing of rotating an image 90 degrees, 180 degrees, or 270 degrees, for example, which requires relatively a low cost, may be executed.

The imaging apparatus may further include: an inclination detection unit that detects an inclination of the pixel array unit, and the image rotation unit may acquire a rotation angle on the basis of an output from the inclination detection unit and rotate the digital image data on the basis of the rotation angle. For example, a gyro sensor may be included, and the image may be rotated on the basis of an output of the gyro sensor.

The imaging apparatus may further include: an image recognition unit that performs recognition processing on the digital image data stored in the storage unit, and the storage unit may further store output data of the image recognition unit. In this manner, recognition processing may be automatically performed with power consumption of the storage unit reduced.

The image recognition unit may perform recognition processing on the digital image data on the basis of a neural network model formed by a weight parameter trained in advance. In this manner, the recognition processing may be executed on the basis of the trained neural network model.

The storage unit may further store the weight parameter. In this manner, the storage unit may store the parameter for forming the neural network.

The storage unit may include at least one of the regions for storing the weight parameter.

A training unit that trains the weight parameter on the basis of the recognition processing in the image recognition unit may further be included. In this manner, training may be performed to improve recognition accuracy.

The control unit may control a region where digital image data that is a target of processing is stored and a region where data after the processing is stored such that the regions are able to be referred to, from among the plurality of regions. In this manner, the control unit may cause power to be selectively distributed to the region to be accessed.

The imaging apparatus may further include: a detection unit that detects a motion of the analog pixel signal acquired by the pixel array unit in the data processed by the image processing unit. In this manner, the motion detection within a range in which the imaging apparatus performs imaging may be performed by a differential circuit, for example.

The detection unit may further perform face image recognition.

A first substrate that includes the pixel array unit and a second substrate that is laminated on the first substrate and includes the converter, the image processing unit, and the storage unit may be included. In this manner, the aforementioned imaging apparatus may be a laminated-type light receiving sensor including a two-layer substrate.

The first substrate and the second substrate may be attached by any of a chip-on-chip (CoC) scheme, a chip-on-wafer (CoW) scheme, and a wafer-on-wafer (WoW) scheme. In this manner, the first substrate and the second substrate may be laminated by any method as long as the method is appropriate.

Also, according to an embodiment, electronic equipment includes: an imaging apparatus that outputs captured image data; and a processor that performs predetermined signal processing on the image data, in which the imaging apparatus may include a pixel array unit that includes a plurality of pixels performing photoelectric conversion, a converter that converts an analog pixel signal output from the pixel array unit into digital image data, an image processing unit that performs image processing on the digital image data, a storage unit that includes a plurality of regions for which a power distribution state is able to be selectively designated and stores at least the digital image data output by the image processing unit, and a detection unit that detects a motion of the analog pixel signal acquired by the pixel array unit in the data processed by the image processing unit, and the processor may provide, to the imaging apparatus, a notification regarding which of the regions in the storage unit the power distribution state is to be switched for in a case in which the detection unit detects a motion.

The electronic equipment may arbitrarily include each component in the aforementioned imaging apparatus. In this manner, it is possible to execute appropriate processing as needed.

Also, according to an embodiment, an imaging method includes: by a pixel array that includes a plurality of pixels, performing photoelectric conversion: by a converter, converting an analog pixel signal output from the pixel array unit into digital image data; by an image processing unit, performing image processing on the digital image data; and by a storage unit that includes a plurality of regions for which a power distribution state is able to be selectively designated, storing at least the digital image data output by the image processing unit in a selectively designated region to which power is distributed.

The imaging method may further include: steps executed by an imaging apparatus that arbitrarily includes each component described above.

DESCRIPTION OF EMBODIMENTS

Hereinafter, embodiments of an imaging apparatus and electronic equipment will be described with reference to the drawings. Although main components of the imaging apparatus and the electronic equipment will be mainly described below, the imaging apparatus and the electronic equipment may include components and functions that are not illustrated or explained. The following description is not intended to exclude components and functions that are not illustrated or explained.

First Embodiment

Figure 1:
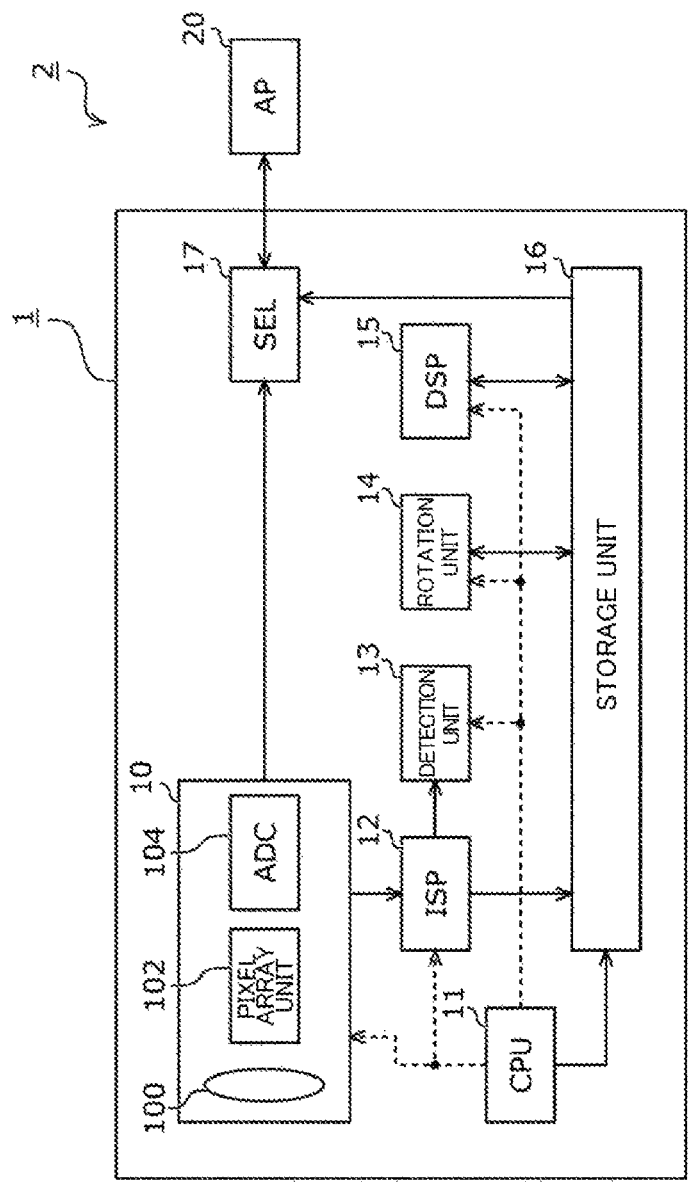
FIG. 1 is a block diagram illustrating an overview of electronic equipment including an imaging apparatus according to an embodiment.

FIG. 1 is a block diagram illustrating an overview configuration of electronic equipment 2 including an imaging apparatus 1 according to an embodiment. The electronic equipment 2 includes an imaging apparatus 1 and an application processor (hereinafter, referred to as an AP) 20. The electronic equipment 2 is a smartphone, a mobile phone, a tablet, a PC, a digital camera, or the like including an imaging function and is not limited to any specific equipment.

The imaging apparatus 1 can be realized by one semiconductor device, and the semiconductor device may be referred to as an image sensor or a solid imaging apparatus. The imaging apparatus 1 includes a CMOS image sensor (hereinafter, referred to as a CIS) 10, a control unit (hereinafter, referred to as a central processing unit; CPU) 11, an image processing unit (hereinafter, referred to as an image signal processor; ISP) 12, a detection unit 13, a rotation unit 14, a digital signal processing unit (digital signal processor; DSP) 15, a storage unit 16, and a selector (hereinafter, referred to as an SEL) 17.

The CIS 10 is an image sensor that includes an imaging unit and an analog digital converter (hereinafter, referred to as an ADC) 104. The imaging unit includes an optical system 100 and a pixel array unit 102. The optical system 100 includes, for example, a zoom lens, a fixed focal length lens, a diaphragm, and the like. The optical system 100 guides incident light to the pixel array unit 102. The pixel array unit 102 includes a plurality of pixels disposed in a two-dimensional direction. Each pixel is constituted by a plurality of unit pixels for a plurality of colors such as R, G, and B. Each unit pixel includes a light receiving element such as a photodiode. The light receiving element performs photoelectric conversion on the incident light and outputs an analog pixel signal. The light incident on the imaging unit forms an image on a light receiving surface in which the plurality of light receiving elements are aligned via the optical system 100. Each light receiving element accumulates electrical charge in accordance with intensity of the incident light and outputs an analog pixel signal in accordance with the amount of accumulated electrical charge.

The ADC 104 converts the analog pixel signal output from the pixel array unit 102 into digital pixel data. Since the ADC 104 performs the A/D conversion, the ISP 12, the detection unit 13, the rotation unit 14, the DSP 15, the storage unit 16, and the SEL 17 on the side of a later stage than the ADC 104 handle digital pixel data. Note that a voltage generation circuit that generates a drive voltage for driving the imaging unit from a power source voltage or the like supplied to the imaging apparatus 1 may be provided inside the ADC 104 or separately from the ADC 104. An output from the ADC 104 is regarded as an output from the CIS 10.

The CPU 11 controls each component inside the imaging apparatus 1 including a power distribution state of the storage unit 16 in response to a command from the AP 20 or the like. The CPU 11 may be integrated with the DSP 15, which will be described later.

The ISP 12 performs various kinds of image processing on the digital pixel data. The ISP 12 may perform signal processing on digital pixel data output from the CIS 10 or may perform image processing on digital pixel data output from the CIS 10 and stored in the storage unit 16. The ISP 12 performs image processing in response to a command from the outside. Details of specific signal processing performed by the ISP 12 will be described later.

The detection unit 13 detects whether or not there has been a motion in the digital image data output from the CIS 10. In other words, the detection unit 13 detects that there has been a motion in a case in which a difference has occurred in the pixel data acquired by the pixel array unit 102 via the optical system 100 and outputs a detection signal to the CPU 11, for example. The detection signal may be output to the AP 20 via the CPU 11 and the SEL 17. Although the detection unit 13 is connected to the ISP 12 in FIG. 1, the detection unit 13 may be connected to the CIS 10 and detect a motion using a differential circuit or the like. The detection unit 13 may detect whether a human face has been imaged in addition to motion detection. In this case, if a person enters the imaging range of the CIS 10, then the processing performed by the DSP 15 and pre-processing thereof may be started. The face recognition may be one with lower accuracy and a lower processing cost as compared with the recognition processing executed by the DSP 15.

The rotation unit 14 causes the digital image data stored in the storage unit 16, that is, the digital image data on which image processing has been performed by the ISP 12 to rotate by an arbitrary angle or a predetermined angle. The rotation unit 14 may store the rotated digital image data in the storage unit 16 again.

The DSP 15 has a function of an information processing unit that performs at least one of predetermined recognition processing and detection processing on the basis of data on which signal processing has been performed by the ISP 12. The DSP 15 performs recognition processing and the like on the data processed by the ISP 12 or data on which the rotation unit 14 has further executed the rotation processing.

The DSP 15 performs an arithmetic operation using a machine learned calculation model by executing a program stored in the storage unit 16, for example. The storage unit 16 stores various kinds of information related to the learned calculation model in advance, and the DSP 15 performs the arithmetic operation by reading necessary information related to the calculation model from the storage unit 16 and inputting the output data of the ISP 12 to the calculation model. Although the machine learned calculation model may not be in any specific form, examples thereof include a calculation model based on a deep neural network (hereinafter, referred to as a DNN). The calculation model can be designed on the basis of a parameter generated by using output data of the CIS 10 or output data of the ISP 12 as an input and inputting learning data associated with a label for the input to the learned calculation model. Also, the DNN may be constituted by a neural network with a plurality of hierarchies.

The DSP 15 can perform predetermined recognition processing, for example, through an arithmetic operation using the DNN. Here, the recognition processing is processing for automatically recognizing whether or not image data that is output data of the ISP 12 includes image information with features. More specifically, the recognition processing is processing for performing an arithmetic operation by giving input data to the calculation model formed by the parameter generated through machine learning, and the input data is output data of the ISP 12.

The DSP 15 performs a product-sum operation between a dictionary coefficient and image data stored in the storage unit 16 in the process of executing the arithmetic operation on the basis of the learned calculation model stored in the storage unit 16. The result of the arithmetic operation performed by the DSP 15 is stored in the storage unit 16 and is also input to the SEL 17. The result of the arithmetic operation performed by the DSP 15 using the calculation model can be image data or various kinds of information (meta data) obtained from the image data. The DSP 15 or the aforementioned CPU 11 may have a function of a memory controller that controls writing in and reading from the storage unit 16, or a memory controller may be provided separately from the DSP 15 and the CPU 11. Also, the DSP 15 may perform detection processing such as motion detection processing and face detection processing. The detection processing may be performed by the ISP 12 instead of the DSP 15. Alternatively, the ISP 12 and the DSP 15 may cooperate to perform the detection processing.

The storage unit 16 stores digital pixel data output from the CIS 10, a program executed by the DSP 15, various kinds of information related to a learned calculation model used by the DSP 15 for the arithmetic operation, and the like. Also, the storage unit 16 may store data of a result of the arithmetic operation performed by the DSP 15. The storage unit 16 is a readable and writable random access memory (RAM). The DSP 15 can execute various machine learning calculation models and perform highly versatile recognition processing and detection processing that can be applied to a wide range by changing the information related to the calculation models in the storage unit 16. Note that in a case in which the DSP 15 performs an arithmetic operation based on a calculation model for a specific application, the storage unit 16 may include, as a part thereof, a read only memory (ROM). A more detailed configuration of the storage unit 16 will be described later.

The SEL 17 selects and outputs output data of the ISP 12 or output data of the DSP 15 on the basis of a selective control signal from the CPU 11. Output data of the SEL 17 is input to the AP 20, for example.

The AP 20 is a semiconductor device that is separated from the imaging apparatus 1 and is mounted on the same base substrate as that of the imaging apparatus 1 or mounted on a base substrate that is different from that of the imaging apparatus 1. The AP 20 includes therein a CPU that is different from the CPU 11 of the imaging apparatus 1 and executes programs of an operating system, various kinds of application software, and the like. The AP 20 includes a DSP that is different from the DSP 15 of the imaging apparatus 1 and performs various kinds of signal processing. The DSP in the AP 20 can perform more advanced signal processing than the ISP 12 or the DSP 15 in the imaging apparatus 1 at a high speed.

Additionally, the AP 20 may be provided with functions of performing image processing, signal processing, and the like of a graphics processing unit (GPU), a baseband processor, and the like. The AP 20 may execute various kinds of processing as needed on image data and a result of the arithmetic operation from the imaging apparatus 1, may perform control to display an image on a display unit of the electronic equipment 2, and may transmit data of a result of the processing to an external cloud server via a predetermined network.

Note that as the predetermined network, various communication networks such as the Internet, a wired local area network (LAN), a wireless LAN, a mobile body communication network, and a near field wireless communication such as Bluetooth (registered trademark) can be applied, for example. Also, a transmission destination of the image data and the result of the arithmetic operation is not limited to the cloud server and may be various information processing apparatuses with communication functions, such as a stand-alone-type server, a file server, and a communication terminal such as a mobile phone.

FIG. 1 illustrates an example in which the AP 20 sends a command to the ISP 12 in the imaging apparatus 1. Although the example in which the AP 20 sends a command to the ISP 12 will be described below, the following description is to be interpreted to include a case in which a processor other than the AP 20 sends a command to the ISP 12 in practice.

(Storage Unit 16)

Figure 2:
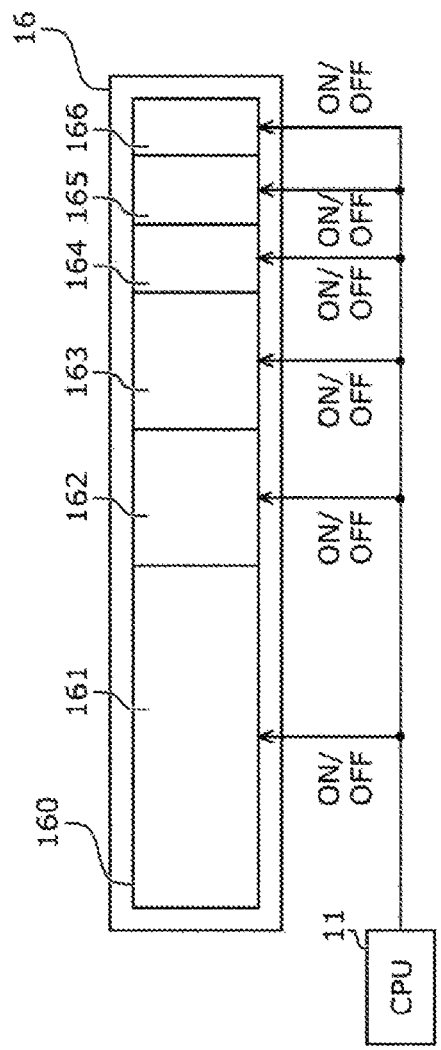
FIG. 2 is a diagram illustrating an overview of a storage unit according to an embodiment.

FIG. 2 is a diagram illustrating a form of the storage unit 16 according to an embodiment. The storage unit 16 is a memory that includes a static RAM (SRAM), for example, as a storage region 160 and can switch a power distribution state for each region belonging to the storage region 160. The CPU 11 switches the power distribution state for each region in the storage region 160 in the storage unit 16. The storage unit 16 can access data stored in each region through the switching of the power distribution state.

For example, the storage region 160 includes small regions 161, 162, 163, 164, 165, and 166 as illustrated in FIG. 2. The storage region 160 may be a storage region in a large-scaled SRAM and have a configuration in which the large region is divided into small-scaled SRAMs including small regions 161, 162, 163, 164, 165, and 166. The CPU 11 can control the SRAMs including these small regions 161, 162, 163, 164, 165, and 166 at an arbitrary timing. As illustrated in the drawing, the CPU 11 may be configured to be able to switch ON/OFF of a power source for each small region.

Each small region may store different amounts of data for each region. For example, the small region 161 has a larger storage region than the other regions. Such a small region with a large capacity among the small regions may store raw data of images or the like or store digital image data processed by the ISP 12, for example. In this manner, a small region to be used may be selected on the basis of data to be stored.

In one example, the small region 161 stores digital image data processed by the ISP 12. The CPU 11 brings the small region 161 in the storage region 160 into a power distribution state and achieves a state in which the small region 161 can be accessed at a timing at which the ISP 12 provides an output. The ISP 12 stores processed digital image data in the small region 161.

Note that in regard to the expression that the small region can/cannot be accessed in the following description, the CPU 11 turning on a power source for the small region is regarded as accessible, and the CPU 11 turning off the power source for the small region is regarded as non-accessible.

The rotation unit 14 causes data stored in the small region 161 to rotate, for example. At this timing, the CPU 11 brings the small region 161 into a power distribution state, for example, and the rotation unit 14 reads data from the small region 161 and stores digital image data after rotation processing in the small region 161.

The DSP 15 executes recognition processing on the data rotated by the rotation unit 14, for example. In a case in which a parameter for executing recognition processing is stored in the small region 166, the CPU 11 controls the power distribution state in the small region 166 to achieve a state in which the small region 166 can be accessed. The DSP 15 accesses the small region 166 and forms a neural network model using a trained parameter. After the DSP 15 forms the neural network model, the CPU 11 may switch the power distribution state of the small region 166 to achieve a non-accessible state.

The CPU 11 controls the power distribution state of the small region 161 to achieve an accessible state at a timing at which the DSP 15 acquires the digital image data. The DSP 15 acquires the digital image data from the small region 161 that has been brought into an accessible state and executes recognition processing. The CPU 11 may switch the power distribution state of the small region 161 at a timing at which an access of the DSP 15 to the small region 161 ends.

In a case in which the region storing recognition processing is the small region 162, the CPU 11 controls the power distribution state of the small region 162 to achieve an accessible state. The DSP 15 may cause a result of the recognition to be stored in the small region 162 and notify the AP 20 of the result of the recognition via the SEL 17. In another example, the CPU 11 may notify the AP 20 of the result of the recognition via the SEL 17 after the DSP 15 stores the result of the recognition in the small region 162.

Data output from the imaging apparatus 1 is not limited to the result of the recognition and may be other data. For example, raw data of images may be output from the storage unit 16 in response to a request from the AP 20. In another example, an input image used for the recognition may be output from the storage unit 16. Appropriate data can be output by the CPU 11 controlling the small region where the data to be output is stored such that the small region is accessible. Also, the AP 20 may include a memory controller (control unit) of the storage unit 16, and in this case, the AP 20 may control the power distribution state of each small region in the storage unit 16 and output data to be acquired.

Note that although it is assumed that no overlapping regions are included in the small regions in FIG. 2, the small regions are not limited thereto, and at least two small regions may share a region within an overlapping range. The CPU 11 (control unit) may separately include therein a memory controller for switching the power distribution state of the small regions in the storage unit 16. In another form, the imaging apparatus 1 may include a memory controller (control unit) that controls the power distribution state of the small regions in the storage unit 16 separately from the CPU 11. Also, although the SRAM is exemplified as a memory that forms the storage region 160, the memory is not limited thereto and may be another non-volatile or volatile memory such as an MRAM or a DRAM. Any memory can be used as long as the memory is suitable for an area, power consumption, a reaction speed, and the like of a semiconductor substrate forming or included in the imaging apparatus 1.

In this manner, the power distribution state is controlled such that a necessary region becomes accessible in the storage region 160 included in the storage unit 16. A case in which the imaging apparatus 1 operates using detection of a motion by the detection unit 13 as a flag will be described as an example.

Figure 3:
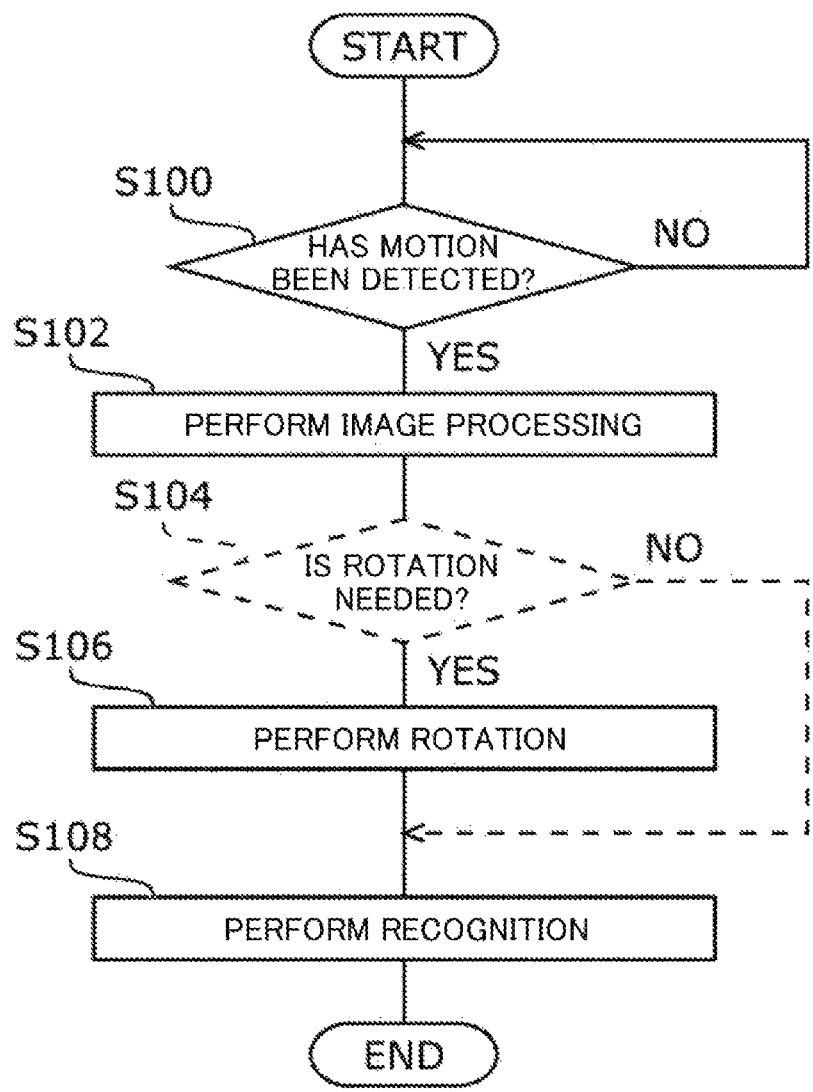
FIG. 3 is a flowchart illustrating a flow of processing according to an embodiment.

FIG. 3 is a flowchart illustrating a flow of processing according to an embodiment.

First, the imaging apparatus 1 causes the CIS 10 to wait in a state in which power consumption is reduced in a low power consumption mode, or the like.

A standby state in which the detection unit 13 including a differential circuit or the like detects generation of a difference in information acquired by the CIS 10 is achieved (S100). In a case in which no motion has been detected (S100: NO), the standby state in S100 is continued.

In a case in which a motion has been detected (S100: YES), the ISP 12 performs necessary image processing on an image acquired by the CIS 10 (S102). For example, since the optical system 100 in the CIS 10 typically causes distortion, dewarp processing for correcting the distortion may be performed. Also, in a case in which recognition processing is performed using a neural network model, processing of reducing, enlarging, or trimming an image in accordance with an input layer of the neural network model, that is, the size of an input image may be performed. The trimming may be executed to include a region where a difference has been detected by the differential circuit. It is possible to use various methods such as linear interpolation, bilinear interpolation, bicubic interpolation, and a Lanczos method, for example, as methods for executing the reduction and the enlargement, and the methods are not limited thereto.

In this manner, the ISP 12 executes pre-processing necessary for the following processing. In a case in which the ISP 12 performs image processing, for example, the CIS 10 may use the storage unit 16 as a buffer or may store an output of the CIS 10 in the storage unit 16. The CPU 11 appropriately controls the power distribution state of the small regions as needed. In a case in which digital image data output by the ISP 12 is stored, a power distribution state of the small region needed for storing the data is controlled. For example, the power distribution state may be controlled such that the small region 161 with a large capacity is brought into an accessible state and the other small regions cannot be accessed in the example in FIG. 2 in an initial state.

Also, in a case in which a user desires to acquire digital image data before recognition with a predetermined size and sets such setting, for example, the ISP 12 may cause the storage unit 16 to store an image reduced or the like into the corresponding size. In this manner, an image that is not used for the recognition processing may be output from the ISP 12. Also, a region-of-interest (ROI) may be set, and the ISP 12 may trim a region including the ROI from the acquired digital image data. Also, the ISP 12 may continue the image trimming on the basis of a result of detection acquired at a timing before a current timing. For example, trimming may be executed to include a range detected in a previous frame and the surroundings of the range. The control of the small regions in the storage unit 16 performed by the CPU 11 may be similarly performed in these cases as well.

Next, whether or not it is necessary to rotate the image is determined (S104). In a case in which an inclination of the CIS 10 in the imaging apparatus 1 with respect to the vertical direction has been able to be acquired, for example, it is determined that rotation is needed if it is necessary to correct the inclination. On the other hand, in a case in which the inclination has not been able to be acquired or in a case in which the inclination is zero degrees, it is determined that no rotation is needed. Note that the processing is not essential processing, and the DSP 15 may execute the processing on the digital image data output by the ISP 12 without performing the rotation processing.

If it is determined that the rotation is needed (S104: YES), the rotation unit 14 executes the processing of rotating the digital image data (S106). The CPU 11 may similarly perform control such that a necessary small region is brought into an accessible state and the other small regions are brought into a non-accessible state in this case as well.

In a case in which the imaging apparatus 1 is placed in a fixed state, for example, rotation of the data acquired by the CIS 10 can be uniquely determined. In such a case, whether or not it is necessary to perform the rotation processing may be determined on the basis of the fixed state, and if the rotation processing is needed, the rotation processing may be performed on the basis of a fixed angle.

In a case in which the imaging apparatus 1 is adapted to be held by a person's hand, such as a digital camera, for example, the rotation may be considered as rotation by 0 degrees or 90 degrees in many cases, and in such cases, it may be determined that the rotation by 0 degrees is needed, that is, no rotation is needed, or the rotation by 90 degrees is needed. In this case, it may be determined that two patterns of rotation of ±90 degrees are needed. Alternatively, it may be determined that only either rotation by 90 degrees or rotation by −90 degrees is needed on the basis of the installation position of a shutter switch. In this manner, the splitting can be freely changed by setting.

In a case in which it is determined that no rotation is needed (S104: NO), or after the rotation processing ends, the DSP 15 executes recognition processing (S108). The recognition processing is executed after the ISP 12 changes the size of the digital image data that is a target to a size suitable for the execution of the recognition processing.

In a case in which the trained parameter is stored in a part of the storage unit 16, the CPU 11 may allow the access to the small region in which the parameter is stored at this timing as described above. The control may be performed such that the necessary small region is accessible and the other regions are not accessible even after the recognition processing as well.

For example, since reading and writing of data with the same size as the data after the image processing performed thereon by the ISP 12 are performed until the processing is performed by the DSP 15, only small regions necessary for the reading and writing processing may be brought into a power distribution state that allows accesses thereto, and the other small regions may be turned off. The necessary small regions may be turned on at a timing at which the processing is performed by the DSP 15.

Also, the recognition processing performed by the DSP 15 may be executed by a plurality of neural network models. For example, the neural network models that performs the recognition processing may be switched in accordance with brightness in the surroundings. In this case, the size that is a target of reduction or the like performed by the IDP 12 may be changed in accordance with an input layer of the neural network model to be used.

Also, digital image data with a different size may be input in parallel to each of two or more neural network models. In such a case, the ISP 12 may store the image with a size changed in accordance with the input layer of each neural network model in the storage unit 16.

After the processing in S108, the processing may return to S100, or processing for outputting necessary data to the AP 20 may be performed.

Figure 4:
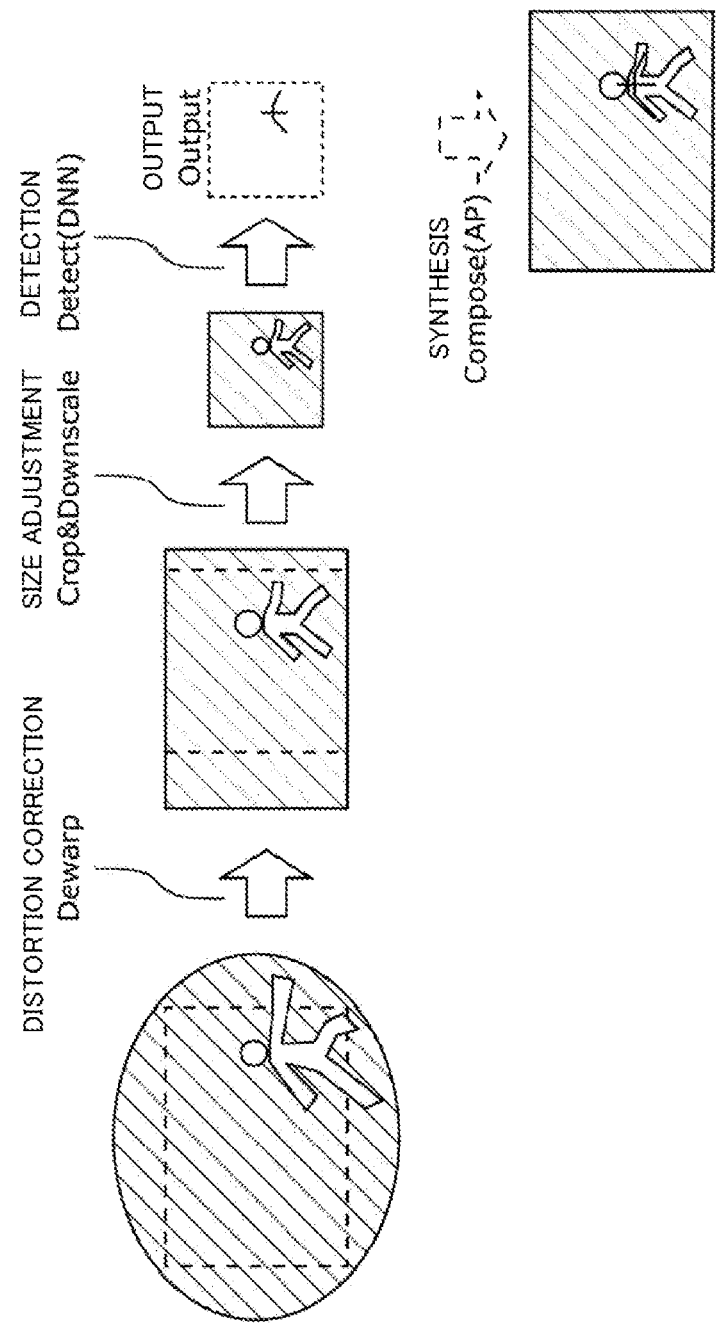
FIG. 4 is a diagram illustrating a transition example of digital image data according to an embodiment.

FIG. 4 is a diagram illustrating an example of a state in which digital image data transitions according to an embodiment.

The image acquired by the CIS 10 includes distortion as the leftmost image, for example. The distortion can be applied not only in such a case of a barrel shape but also a case of a bobbin shape. Also, the image may be captured with other aberration that can be processed in image processing. The rectangles with dashed lines in the drawing are image regions after the image processing.

The ISP 12 performs distortion correction of such an image first. The ISP 12 performs the distortion correction using a typical method. For example, since information regarding the optical system and the like in the CIS 10 can be acquired in advance, the distortion correction is performed by a distortion correction parameter similarly to an imaging parameter. The diagram after the distortion correction is performed is the second diagram from the left. The image is converted into an image with a size of 1920×1080 pixels, for example, through the distortion correction. Note that the number of pixels is illustrated as an example and is not intended to limit the present disclosure.

Next, the ISP 12 converts the image into an image with an image size of 256×256 pixels, for example, through trimming or reduction of the image. The size is a size based on an input image of the neural network model formed by the DSP 15. The size may be smaller or larger than this, for example. A plurality of neural network models with variations in accuracy may be prepared in accordance with sizes. In this case, the ISP 12 executes size change one solution or a plurality of solutions on the basis of the neural network model to be used and acquires one image or a plurality of images with a changed size. The neural network model may be set in advance or may be selected on the basis of information acquired by the CIS 10 or on the basis of a command from the AP 20.

Next, the DSP 15 inputs the image with the adjusted size to the neural network model, outputs a result of identification, and outputs the result to a region in the storage unit 16 controlled by the CPU 11. The stored data may be output to the AP 20 via the SEL 17 and may be synthesized with an image separately output to the AP 20 and processed by the ISP 12, for example. In the example in FIG. 4, the position where a person is present may be identified by the imaging apparatus 1, the position may be synthesized with an image before the identification, and the AP 20 may output the synthesized image.

Figure 5:
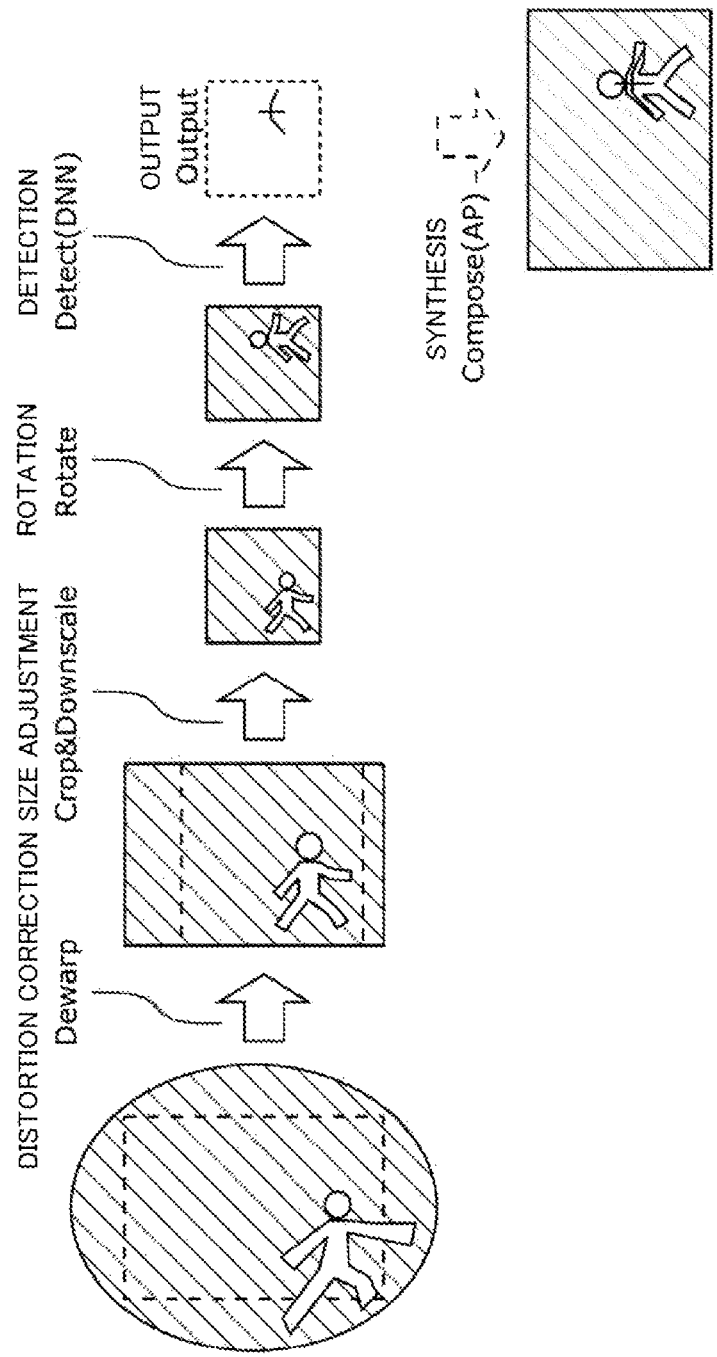
FIG. 5 is a diagram illustrating a transition example of digital image data according to an embodiment.

FIG. 5 is a diagram of a case in which rotation of digital image data is executed in addition to FIG. 4. The processing of the CIS 10 acquiring the digital image data and of the ISP 12 performing distortion correction and size adjustment is similar to that in FIG. 4.

The rotation unit 14 causes the digital image data after the size adjustment to rotate. In the example in FIG. 5, the digital image data is rotated by 90 degrees to the left. In this manner, the rotation unit 14 may rotate the image processed by the IPS 12 to create digital image data at an angle that facilitates recognition.

In the above description, it is assumed that the rotation processing is executed as needed. Moreover, although it is assumed that the distortion correction is executed, the present disclosure is not limited thereto. In a case of an optical system that hardly causes distortion, or in a case in which it is desired to perform recognition within a range in which no distortion occurs, for example, the distortion correction is not essential. The same applies to the size adjustment, and it is only necessary to execute the processing related to the size, such as trimming, reduction, and enlargement, as needed.

As described above, according to the present embodiment, it is possible to provide an imaging apparatus that includes a memory that includes a plurality of regions and can turn on/off of a power source of each region, an image processing unit, and a signal processing unit. For the memory, it is possible to turn on the power source for the region needed for processing and to turn off the other power sources in various kinds of processing. It is possible to curb power consumption of the imaging apparatus through such control.

Also, in a case in which the imaging apparatus is used for a monitoring camera, for example, it is possible to execute processing from the motion detection performed by the detection unit to person recognition or the like inside the imaging apparatus, and it is also possible to curb power consumption of an external device. Moreover, it is possible to select necessary processing and perform processing up to the recognition processing, and it is also possible to output a result of the recognition as needed. In this manner, it is also possible to minimize communication with the outside, and it is possible to output data with no delay as needed. Also, it is possible to acquire necessary data inside the imaging apparatus in this manner, thereby to select and output necessary data, and also to reduce the amount of data output to the outside.

Also, as the small regions inside the storage region 160 in the storage unit 16, small regions that are needed to be turned on for various kinds of information processing may be set, for example. In this manner, it is possible to curb redundant utilization of the memory, and for example, it is also possible to reduce the area of a chip used by the memory in a chip of the imaging apparatus 1, by determining a role in each function for each small region or a role to be accessed by each component in advance.

Second Embodiment

An imaging apparatus 1 includes an inclination detection unit in addition to the components in the aforementioned embodiment and adjusts a rotation angle in accordance with the inclination of a CIS 10 detected by the inclination detection unit.

Figure 6:
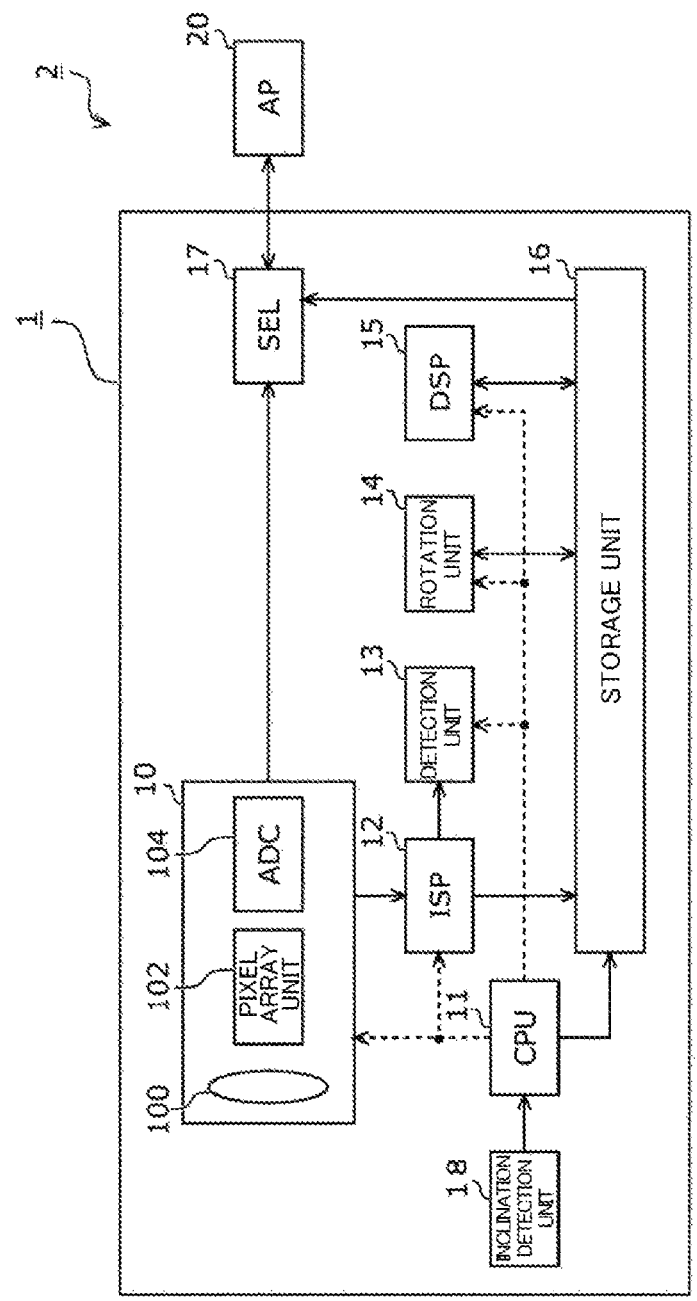
FIG. 6 is a block diagram illustrating an overview of electronic equipment including an imaging apparatus according to an embodiment.

FIG. 6 is a block diagram illustrating an overview configuration of electronic equipment 2 including an imaging apparatus 1 according to an embodiment. As illustrated in the drawing, the imaging apparatus 1 further includes an inclination detection unit 18. The inclination detection unit 18 detects an inclination of the CIS 10, for example, and outputs the inclination angle to a CPU 11. The output destination may not be out the CPU 11, and the inclination detection unit 18 may output the inclination angle to a rotation unit 14, for example. Although the inclination detection unit 18 includes, a gyro sensor, for example, the detection of the inclination may be realized by a method other than the gyro sensor.

The same operations are executed until an ISP 12 performs image processing on data captured by the CIS 10. The rotation unit 14 causes the digital image data processed by the ISP 12 to rotate on the basis of the angle detected by the inclination detection unit 18. The rotation unit 14 may calculate a parameter for affine transformation, for example, on the basis of the angle detected by the inclination detection unit 18. In another example, a conversion table for rotation at representative angles may be generated in any of the small regions in the storage unit 16 in advance, and the image may be rotated on the basis of an angle in the table that is close to the angle detected by the inclination detection unit 18. In this case, the CPU 11 may perform control for the small region in which the table is stored and may read data. The CPU 11 may achieve a state in which the small region cannot be accessed after the table data is read.

In a case in which a parameter is calculated and rotation is executed at an arbitrary angle, a method of interpolation between pixels is not particularly limited, and various methods such as linear interpolation, bilinear interpolation, and bicubic interpolation can be used.

Figure 7:
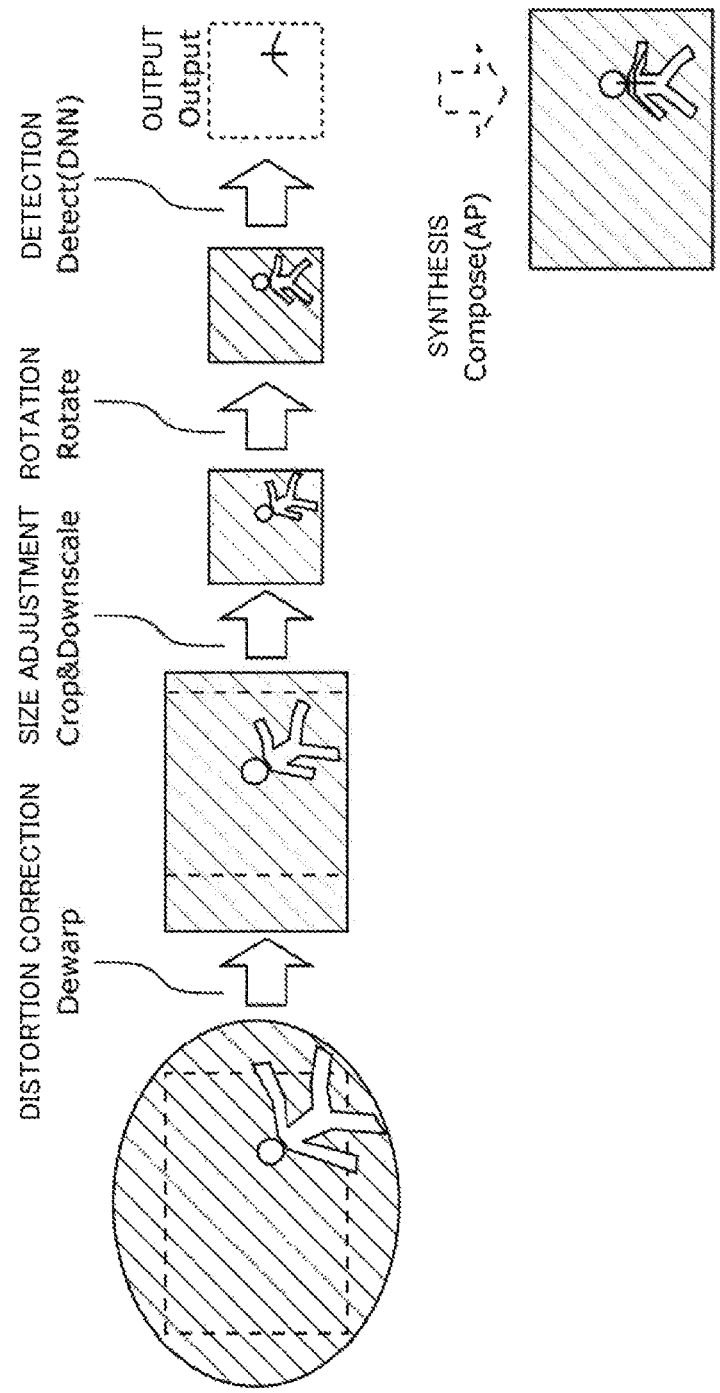
FIG. 7 is a diagram illustrating a transition example of digital image data according to an embodiment.

FIG. 7 is a diagram illustrating a transition example of digital image data in a case in which rotation is performed at an arbitrary angle in the present embodiment. For example, the inclination detection unit 18 detects how much the imaging apparatus 1 is inclined with respect to the ground. The rotation angle is set on the basis of a result of the detection. Similarly to FIG. 5, the rotation unit 14 executes rotation on the basis of the angle detected by the inclination detection unit 18 after the ISP 12 executes distortion correction and size adjustment. The following flow is similar to that in the aforementioned embodiment.

Eventually, the AP 20 can acquire an appropriately synthesized image.

Figure 8:
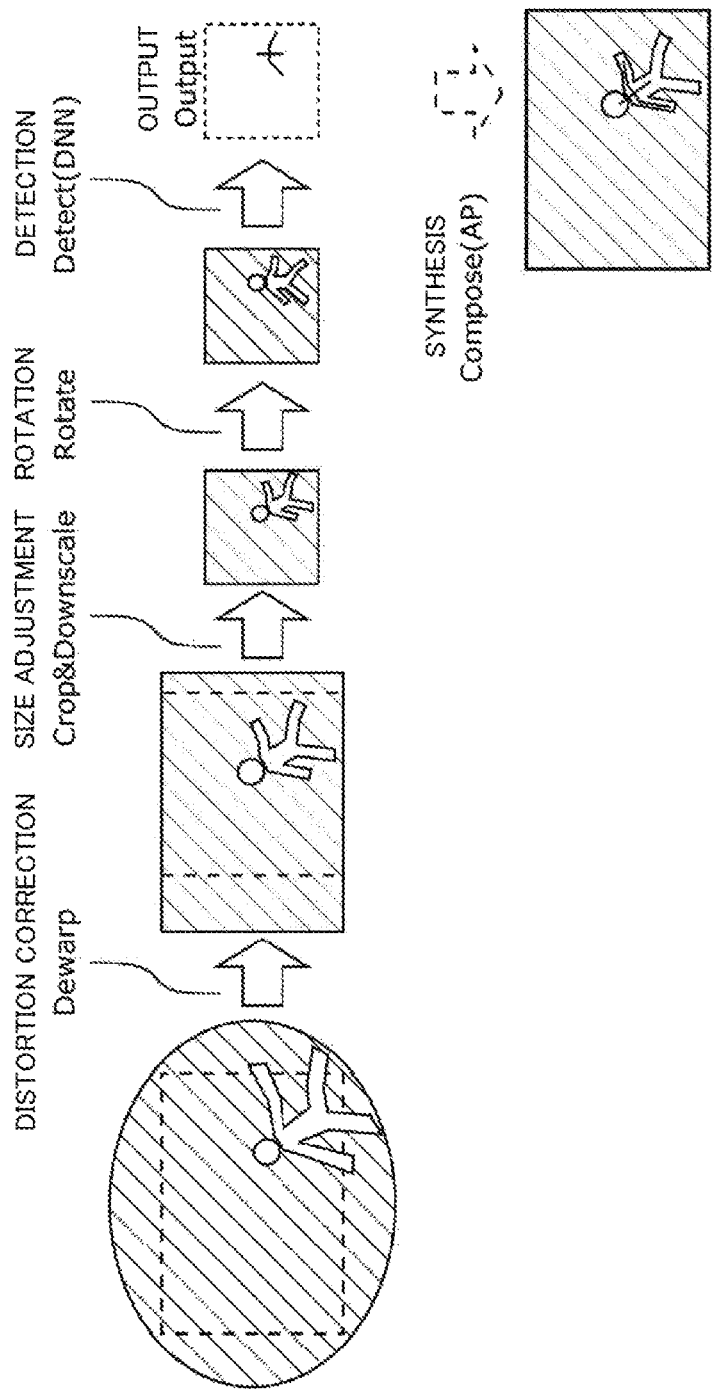
FIG. 8 is a diagram illustrating a transition example of digital image data according to an embodiment.

FIG. 8 illustrates another synthesis example of an image in the AP 20. Processing may be performed as illustrated in FIG. 8 after the ISP 12 performs the distortion correction and the size adjustment and the rotation unit 14 performs rotation and detection. In other words, a result of the detection may be appropriately affine-transformed (or linearly transformed) on the basis of the angle detected by the inclination detection unit 18 and synthesis with digital image data after distortion correction may be performed. The image synthesis performed by the AP 20 may be appropriately processed on the basis of the detection result and the rotation angle and is not limited to the examples in FIGS. 5, 7, and 8.

As described above, according to the present embodiment, the inclination detection unit 18 including a gyro sensor or the like can detect the inclination of the CIS 10, particularly, the pixel array unit 102 from the vertical direction and acquire an angle at which the rotation unit 14 is to rotate the digital image data, on the basis of the detected inclination. In this manner, it is possible to execute more robust recognition under conditions closed to the imaging apparatus 1 by including the inclination detection unit 18.

Note that although the inclination detection unit 18 is assumed to be included in the imaging apparatus 1, the inclination detection unit 18 is not limited thereto and may be included outside the imaging apparatus 1.

Although the imaging apparatus 1 performs only outputs in each of the aforementioned embodiments, the imaging apparatus 1 may receive feedback of a result output by the DSP 15 from the AP 20. For example, the AP 20 may receive correction of a result of identification achieved by a user after a synthesized diagram as illustrated in FIGS. 4 and 5 is output. Updating of the parameter of the neural network model in the DSP 15 may be executed in response to the feedback from the AP 20 on the basis of the correction result. Additionally, the AP 20 may perform training on the basis of new data, and the AP 20 may receive the updated parameter. A necessary small region in the storage unit 16, that is, a small region where the parameter is stored may be turned on, and the control may then be performed, in a case in which the parameter is received as well. In this manner, it is possible to further improve accuracy of the recognition performed by the DSP 15. Also, the training unit that performs the training may be included in the imaging apparatus 1. In this case, the imaging apparatus 1 can improve accuracy of recognition without outputting what kind of training data has been used to the outside.

(Chip Structure of Imaging Apparatus 1)

Figure 9:
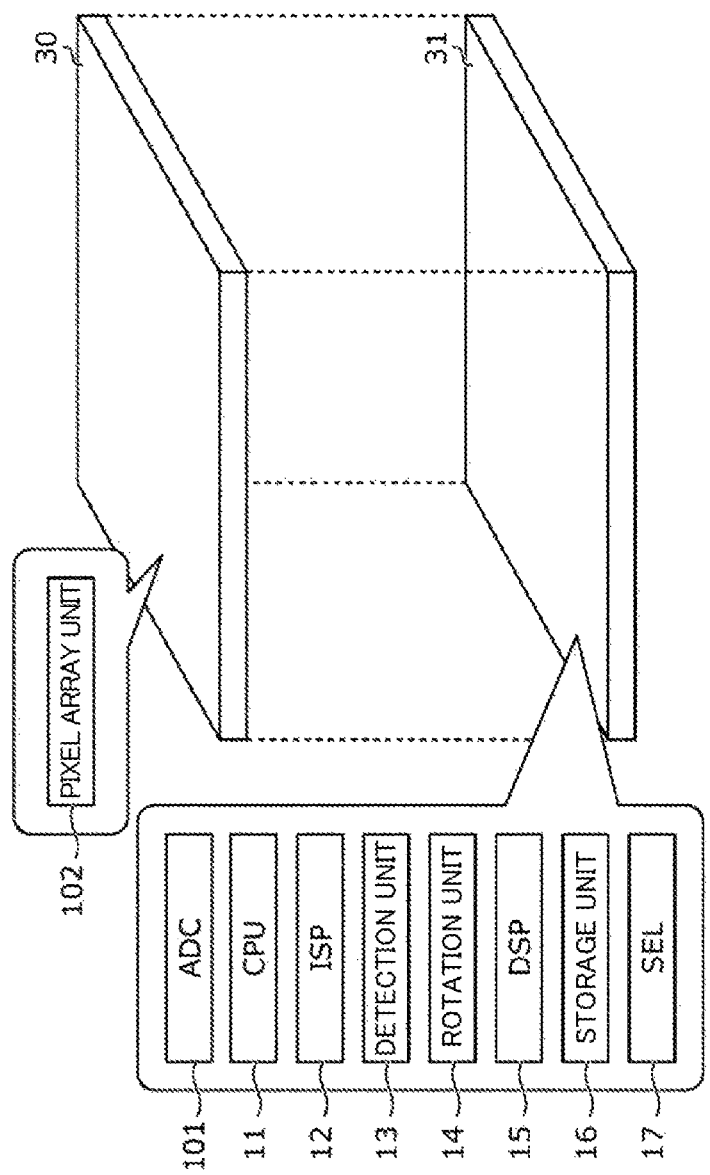
FIG. 9 is a diagram illustrating an implementation example of the imaging apparatus according to an embodiment.

Next, a chip structure of the imaging apparatus 1 in FIG. 1 will be described. FIG. 9 is a diagram illustrating an example of the chip structure of the imaging apparatus 1 in FIG. 1. The imaging apparatus 1 in FIG. 9 is a laminated body in which a first substrate 30 and a second substrate 31 are laminated. The first substrate 30 and the second substrate 31 may also be called dies. Although an example in which the first substrate 30 and the second substrate 31 have rectangular shapes is illustrated in the example in FIG. 9, the specific shapes and sizes of the first substrate 30 and the second substrate 31 may be arbitrarily determined. Also, the first substrate 30 and the second substrate 31 may have the same size or mutually different sizes.

The pixel array unit 102 illustrated in FIG. 1 is disposed in the first substrate 30. Also, at least a part of the optical system 100 in the imaging unit 10 may be mounted in an on-chip manner on the first substrate 30.

The ADC 104, the CPU 11, the ISP 12, the detection unit 13, the rotation unit 14, the DSP 15, the storage unit 16, and the SEL 17 illustrated in FIG. 1 are disposed in the second substrate 31. Additionally, an input/output interface unit, a power source circuit, and the like, which are not illustrated, may be disposed in the second substrate 31.

As a specific form of attachment, a so-called chip-on-chip (CoC) scheme in which the first substrate 30 and the second substrate 31 are cut from a wafer, for example, into individual pieces and the pieces are vertically piled up and attached to each other may be employed. Alternatively, a so-called chip-on-wafer (CoW) scheme in which one of the first substrate 30 and the second substrate 31 (for example, the first substrate 30) is cut from a wafer into an individual piece and the first substrate 30 cut into the piece is attached to the second substrate 31 before being cut into a piece may be employed. Alternatively, a so-called wafer-on-wafer (WoW) scheme in which the first substrate 30 and the second substrate 31 are attached to each other in wafer states may be employed.

As a method for bonding the first substrate 30 and the second substrate 31, plasma bonding, for example, can be used. However, various other bonding methods may be used.

Figure 10:
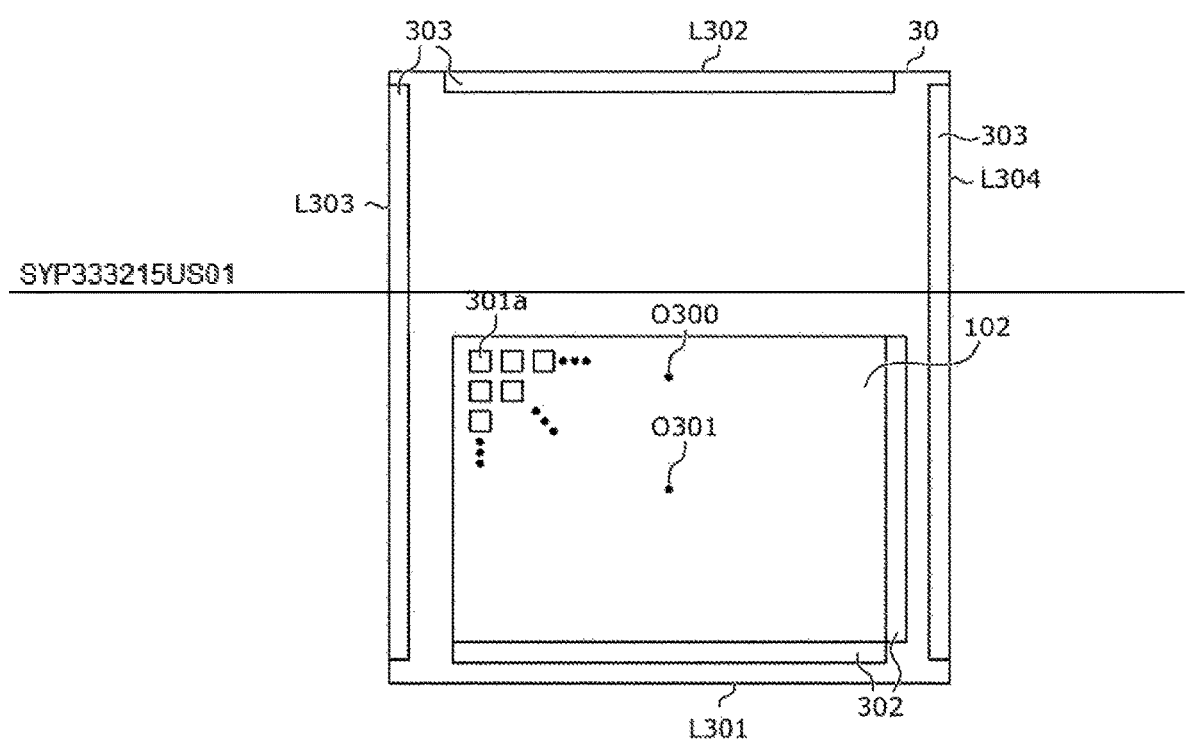
FIG. 10 is a diagram illustrating a layout example of a first substrate according to an embodiment.
Figure 11:
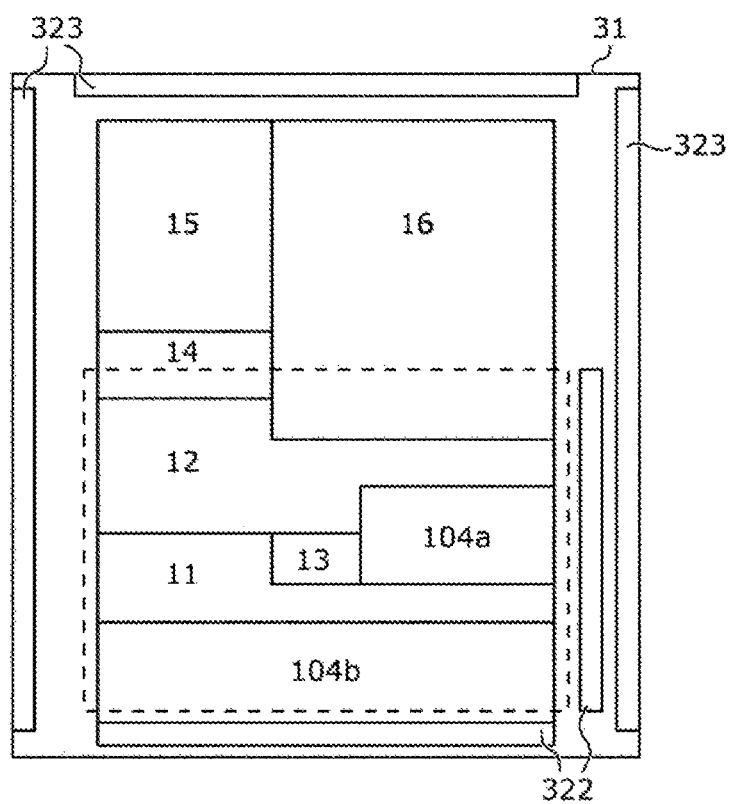
FIG. 11 is a diagram illustrating a layout example of a second substrate according to an embodiment.

FIGS. 10 and 11 are diagrams illustrating examples of the layout of the first substrate 30 and the second substrate 31. FIG. 10 illustrates a layout example of the first substrate 30 in which the pixel array unit 102 is disposed. In the example in FIG. 10, the pixel array unit 102 is disposed with a bias on the side of one side L301 among four sides L301 to L304 of the first substrate 30. In other words, the pixel array unit 102 is disposed such that the center portion 0301 thereof is closer to the side of the side L301 than the center portion 0300 of the first substrate 30. Note that if a surface of the first substrate 30 in which the pixel array unit 102 is provided has a quadrangular shape, the side L301 may be a shorter side of the first substrate 30, for example. However, the present disclosure is not limited thereto, and the pixel array unit 102 may be disposed with a bias toward the longer side.

A through silicon via (hereinafter, referred to as a TSV) array 302 in which a plurality of through silicon vias penetrating through the first substrate 30 are aligned is provided as a wiring for electrically connecting each unit pixel 301a in the pixel array unit 102 to the ADC 104 disposed in the second substrate 31 in a region that is close to the side L301 among the four sides of the pixel array unit 102, in other words, a region between the side L301 and the pixel array unit 102. It is possible to easily secure a space for disposing the ADC 104 and the like in the second substrate 31 by causing the TSV array 302 to be close to the side L301 to which the pixel array unit 102 is located to be close in this manner.

Note that the TSV array 302 may also be provided in a region that is close to the side L304 (however, this may be the side L303) out of the two sides L303 and L304 that intersect the side L301, in other words, a region between the side L304 (or the side L303) and the pixel array unit 102.

A pad array 303 including a plurality of pads linearly aligned is provided at each of the sides L302 and L303 to which the pixel array unit 102 is not disposed to be close, from among the four sides L301 to L304 of the first substrate 30. The pad array 303 may include a pad (also referred to as a power source pin) to which a power source voltage for an analog circuit such as the pixel array unit 102 and the ADC 104, for example, is applied. Also, the pad array 303 may include a pad (also referred to as a power source pin) to which a power source voltage for an digital circuit such as the CPU 11, the ISP 12, the detection unit 13, the rotation unit 14, the DSP 15, the storage unit 16, and the SEL 17 is applied. Alternatively, the pad array 303 may include a pad (also referred to as a signal pin) for an interface such as a mobile industry processor interface (MIPI) and a serial peripheral interface (SPI). Alternatively, the pad array 303 may include a pad (also referred to as a signal pin) for inputting and outputting a clock and data. Each pad is electrically connected to, for example, an external power source circuit and an interface circuit via a wire. It is preferable that each pad array 303 and the TSV array 302 be sufficiently separated from each other to such an extent that influences of reflection of a signal from the wire connected to each pad in the pad array 303 can be ignored.

FIG. 11 illustrates a layout example of the second substrate 31 in which the ADC 104, the CPU 11, the ISP 12, the detection unit 13, the rotation unit 14, the DSP 15, and the storage unit 16 are disposed. The ADC 104, the CPU 11, the ISP 12, the detection unit 13, the rotation unit 14, the DSP 15, and the storage unit 16 are disposed in the second substrate 31. In the layout example in FIG. 11, the ADC 104 is split into two regions, namely an ADC unit 104a and a digital-to-analog converter (DAC) unit 104b. The DAC 104b is a circuit that supplies a reference voltage for AD conversion to the ADC unit 104a and is included in a part of the ADC 104 in a broad sense. Although not illustrated in FIG. 11, the SEL 17 is also disposed in the second substrate 31.

Also, a wiring 322 electrically connected to each TSV in the TSV array 302 penetrating through the first substrate 30 (hereinafter, simply referred to as a TSV array 302) by being brought into contact with the TSV array 302 is provided in the second substrate 31. Moreover, the second substrate 31 is provided with a pad array 323 in which a plurality of pads electrically connected to the pads in the pad array 303 in the first substrate 30 are linearly aligned.

For the connection between the TSV array 302 and the wiring 322, a so-called twin-TSV scheme in which two TSVs, namely the TSV provided in the first substrate 30 and the TSV provided from the first substrate 30 to the second substrate 31 are connected on an external surface of the chip, for example, may be employed. Alternatively, a so-called shared TSV scheme in which connection is established by a common TSV provided from the first substrate 30 to the second substrate 31 may be employed. However, the present disclosure is not limited thereto, various connection forms such as a so-called Cu-Cu bonding scheme in which copper (Cu) exposed from the bonding surface of the first substrate 30 and the bonding surface of the second substrate 31 is bonded to each other, for example, may be employed.

A connection form between each pad in the pad array 303 in the first substrate 30 and each pad in the pad array 323 in the second substrate 31 is, for example, wire bonding. However, the connection form is not limited thereto and may be a connection form such as a through hole or castellation.

In the layout example of the second substrate 31, the vicinity of the wiring 322 connected to the TSV array 302 is defined as an upstream side, for example, and the ADC unit 104a, the ISP 12, the rotation unit 14, and the DSP 15 are disposed in this order from the upstream side along a flow of signals read from the pixel array unit 102. In other words, the ADC unit 104a to which a pixel signal read from the pixel array unit 102 is first input is disposed in the vicinity of the wiring 322 on the most upstream side, then the ISP 12 and the rotation unit 14 are disposed, and the DSP 15 is disposed in the furthest region from the wiring 322. Also, the detection unit 13 may be disposed to be adjacent to the ADC unit 104a or the ISP 12 such that information output by the ADC unit 104a or the ISP 12 can be easily acquired, for example. It is possible to shorten the wiring to connect each component by employing such a layout in which the ADC 104 to the DSP 15 are disposed from the upstream side along the flow of the signals. In this manner, it is possible to achieve reduction of a signal delay, reduction of a signal propagation loss, an improvement in an S/N ratio, saving of power consumption, and the like.

Also, the CPU 11 is disposed in the vicinity of the wiring 322 on the upstream side, for example. In FIG. 11, the CPU 11 is disposed to be in contact with the ADC 104 and the ISP 12. It is possible to achieve reduction of a signal delay when the CPU 11 controls the pixel array unit 102, reduction of a signal propagation loss, an improvement in an S/N ratio, reduction of power consumption, and the like by employing such a layout. Also, it is possible to dispose the signal pin and the power source pin for the analog circuit in the vicinity (on the lower side in FIG. 11, for example) of the analog circuit together, and to dispose the remaining signal pin and power source pin for the digital circuit in the vicinity (on the upper side in FIG. 11, for example) of the digital circuit together, or to dispose the power source pin for the analog circuit and the power source pin for the digital circuit to be sufficiently separated from each other.

In addition, the DSP 15 is disposed to the side opposite to the ADC unit 104a corresponding to the most downstream side in the layout illustrated in FIG. 11. It is possible to dispose the DSP 15 in a region in which the DSP 15 does not overlap the pixel array unit 102 by employing such a layout, in other words, in the lamination direction of the first substrate 30 and the second substrate 31 (hereinafter, simply referred to as an up-down direction).

It is possible to reduce entrance of noise generated by the DSP 15 executing the signal processing into the pixel array unit 102 by employing the configuration in which the pixel array unit 102 in the region illustrated by the dashed lines and the DSP 15 do not overlap in the up-down direction in this manner. As a result, it is possible to reduce entrance of noise caused by the signal processing performed by the DSP 15 on the pixel array unit 102 even in a case in which the DSP 15 is caused to operate as a processing unit that executes an arithmetic operation based on the learned model, and it is thus possible to acquire an image with quality degradation reduced.

The storage unit 16 is disposed in the vicinity of the ISP 12, the rotation unit 14, and the DSP 15. The storage unit 16 stores various kinds of information related to digital image data and a learned calculation model. The rotation unit 14 reads digital image data output by the ISP 12 and stored in a predetermined region in the storage unit 16 as needed, causes the digital image to rotate, and stores the digital image data in the same or different predetermined region in the storage unit 16.

The DSP 15 reads the information related to the calculation model and the digital image data output by the ISP 12 or the rotation unit 14 from the storage unit 16, performs an arithmetic operation using the calculation model, and stores a result of the arithmetic operation in the storage unit 16. Also, the DSP 15 may output the result of the arithmetic operation to the outside via the SEL 17 without storing the result of the arithmetic operation in the storage unit 16.

It is possible to shorten the signal propagation time when the storage unit 16 is accessed, and the rotation unit 14 and the DSP 15 can access the storage unit 16 at a high speed, by disposing the storage unit 16 in the vicinity of the rotation unit 14 and the DSP 15 in this manner.

The pad array 323 is disposed on the second substrate 31 corresponding to the pad array 303 on the first substrate 30 in the up-down direction, for example. Here, pads located in the vicinity of the ADC unit 104a from among pads included in the pad array 323 are used for propagating power source voltages and analog signals for the analog circuits (mainly for the ADC unit 104a). On the other hand, pads located in the vicinity of the CPU 11, the ISP 12, the detection unit 13, the rotation unit 14, the DSP 15, and the storage unit 16 are used to propagate power source voltages for digital circuits and digital signals (mainly for the CPU 11, the ISP 12, the detection unit 13, the rotation unit 14, the DSP 15, and the storage unit 16). It is possible to shorten the distance of the wire connecting each pad to each component by employing such a pad layout. In this manner, it is possible to realize reduction of a signal delay, reduction of signal and power source voltage propagation losses, an improvement in an S/N ratio, reduction of power consumption, and the like.

According to the present embodiment, the ISP 12 in the imaging apparatus 1 can perform signal processing on the basis of an information detection signal on the basis of a result of motion detection performed by the detection unit 13, for example, in this manner, and the ISP 12 can thus perform signal processing that is optimal for the imaging apparatus 1 even in a case in which the AP 20 does not give any command to the ISP 12. More specifically, in a case in which information processing such as recognition processing and detection processing based on the output data of the ISP 12 and digital image data processing needed for the recognition processing is performed inside the imaging apparatus 1, the ISP 12 can perform signal processing to obtain input data that is optimal for performing information processing such as the recognition processing. In this manner, it is possible to obtain an intelligent imaging apparatus 1 capable of performing information processing such as recognition processing and detection processing with high reliability inside the imaging apparatus 1 and capable of performing information processing such as recognition processing and detection processing in which not only imaging is performed.

Some disposition examples will be described. It is possible to achieve effects similar to those in FIG. 11 in the following examples as well, and separate effects are individually achieved.

Figure 12:
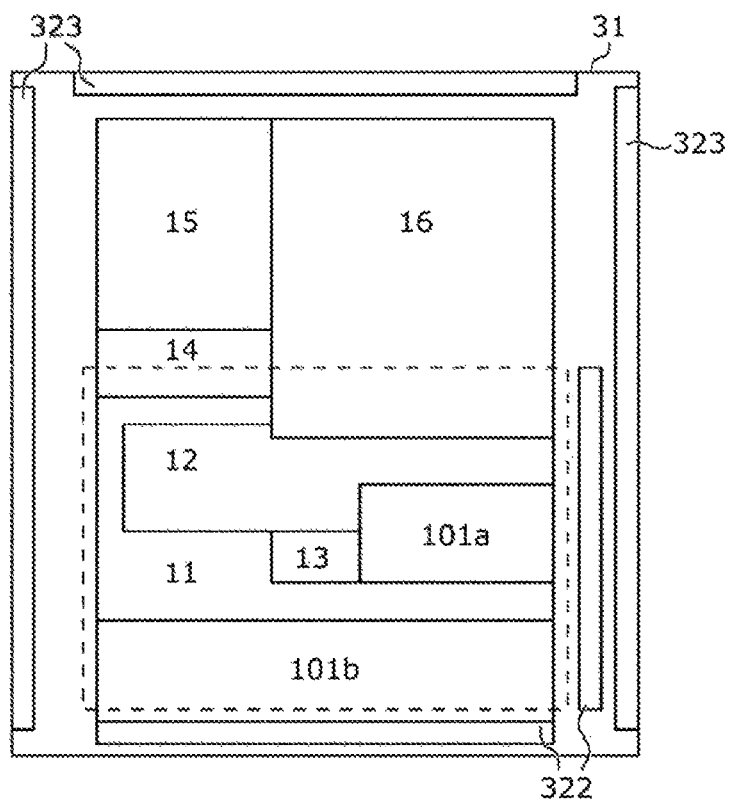
FIG. 12 is a diagram illustrating a layout example of a second substrate according to an embodiment.

FIG. 12 is a diagram illustrating another disposition example of the second substrate 31. As illustrated in FIG. 12, the CPU 11, particularly, the memory controller unit in the CPU 11 that switches the power distribution state of the storage unit 16 may be disposed to come into contact with the storage unit 16.

Figure 13:
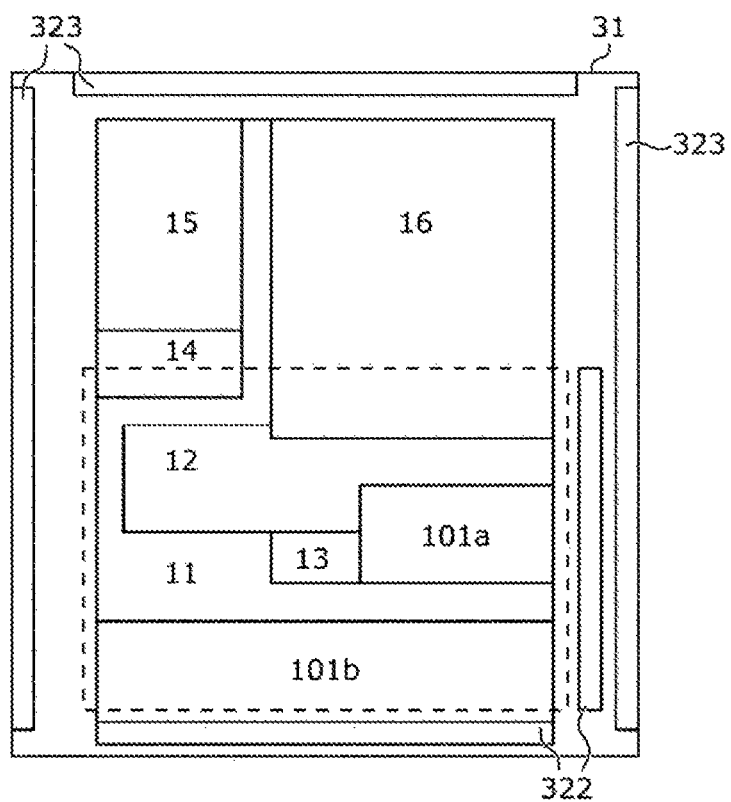
FIG. 13 is a diagram illustrating a layout example of a second substrate according to an embodiment.

FIG. 13 is a diagram illustrating yet another disposition example of the second substrate 31. As illustrated in FIG. 13, the CPU 11, particularly, the memory controller unit in the CPU 11 that switches the power distribution state of the storage unit 16 may be disposed to come into contact with the storage unit 16 in a wider region as compared with FIG. 12. It is possible to switch the power distribution state in each region of the storage unit 16 at a higher speed by employing such disposition.

Figure 14:
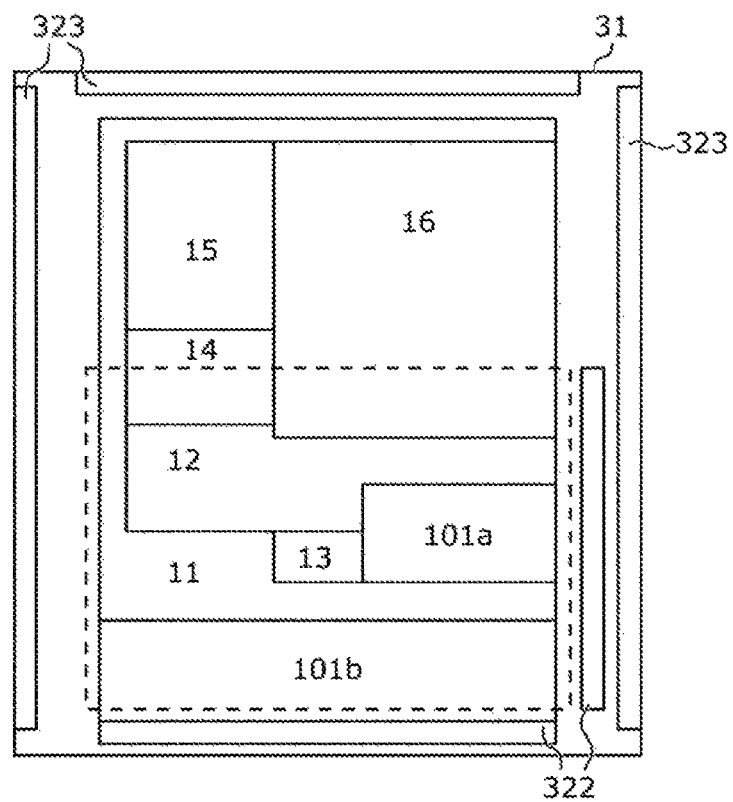
FIG. 14 is a diagram illustrating a layout example of a second substrate according to an embodiment.

FIG. 14 is a diagram illustrating yet another disposition example of the second substrate 31. As illustrated in FIG. 14, the CPU 11 may be disposed to come into contact with the ISP 12, the rotation unit 14, the DSP 15, and the storage unit 16. In this case, it is possible to raise the speed of the control of the ISP 12, the rotation unit 14, and the DSP 15 and also to switch the power distribution state of each region in the storage unit 16 at a high speed.

The examples in FIGS. 11 to 14 have been exemplified as some examples, and disposition of each component in the second substrate 31 is not limited thereto. In other words, it is only necessary for the CPU 11 to be appropriately disposed such that the power distribution state of the storage unit 16 can be switched at a high speed or with high accuracy and each of the other components can be controlled at a high speed.

Figure 15:
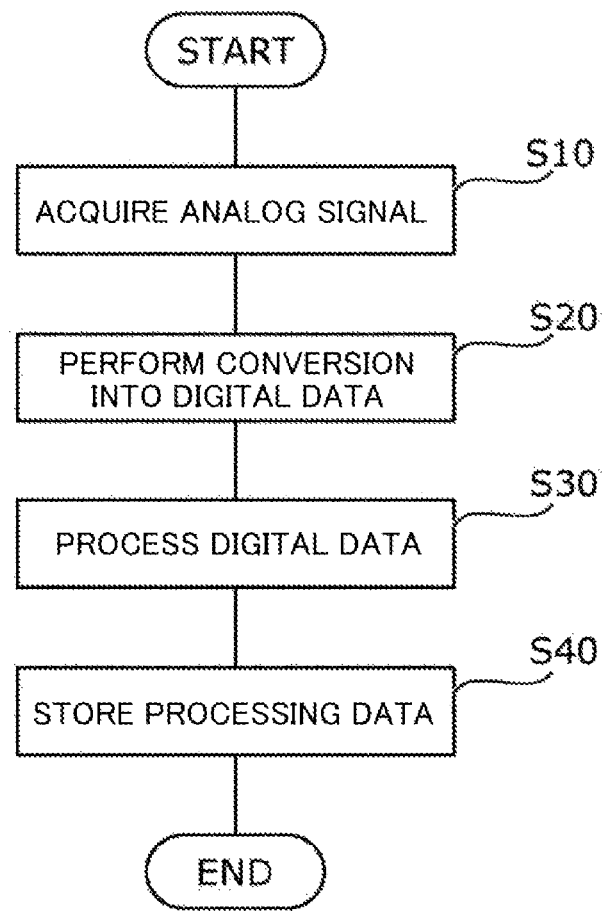
FIG. 15 is a flowchart illustrating processing performed by the imaging apparatus according to an embodiment.

FIG. 15 is a flowchart illustrating processing performed by the imaging apparatus 1 in each of the aforementioned embodiments.

First, the pixels in the pixel array unit 102 performs photoelectric conversion of received light, and an analog pixel signal based on the intensity of the received light is acquired (S10).

Next, the converter such as an ADC 104 converts the analog pixel signal into digital image data (S20).

Then, the image processing unit such as an ISP 12 or the information processing unit that executes other information processing executes image processing or information processing on the digital image data (S30).

The digital image data on which the processing has been executed is stored in the storage unit 16, and the CPU 11 appropriately selects a power distribution state to designate a region at this timing and stores the processed data in the appropriate region in the storage unit 16 (S40).

In this manner, the imaging apparatus 1 is realized in a state in which data acquisition, data storage, and power consumption of the storage unit 16 can be appropriately controlled. As a result, it is possible to acquire and store data with the optimized power consumption.

(Applications to Other Sensors)

Note that although the technology according to the present disclosure is applied to the imaging apparatus (image sensor) 1 that acquires a two-dimensional image has been exemplified in the aforementioned first and second embodiments, the application target of the technology according to the present disclosure is not limited to the imaging apparatus. For example, it is possible to apply the technology according to the present disclosure to various light receiving sensors such as a time-of-flight (ToF) sensor, an infrared ray (IR) sensor, and a dynamic vision sensor (DVS). In other words, it is possible to achieve reduction of noise included in the results obtained by the sensor, size reduction of a sensor chip, and the like by employing a laminated-type chip structure for the light receiving sensor.

(Example of Applications to Moving Bodies)

The technology according to the present disclosure (the present technology) can be applied to various products. For example, the technology according to the present disclosure may be realized as an apparatus mounted on any type of moving body such as an automobile, an electric vehicle, a hybrid electric vehicle, a motorcycle, a bicycle, a personal mobility, an airplane, a drone, a ship, and a robot.

Figure 16:
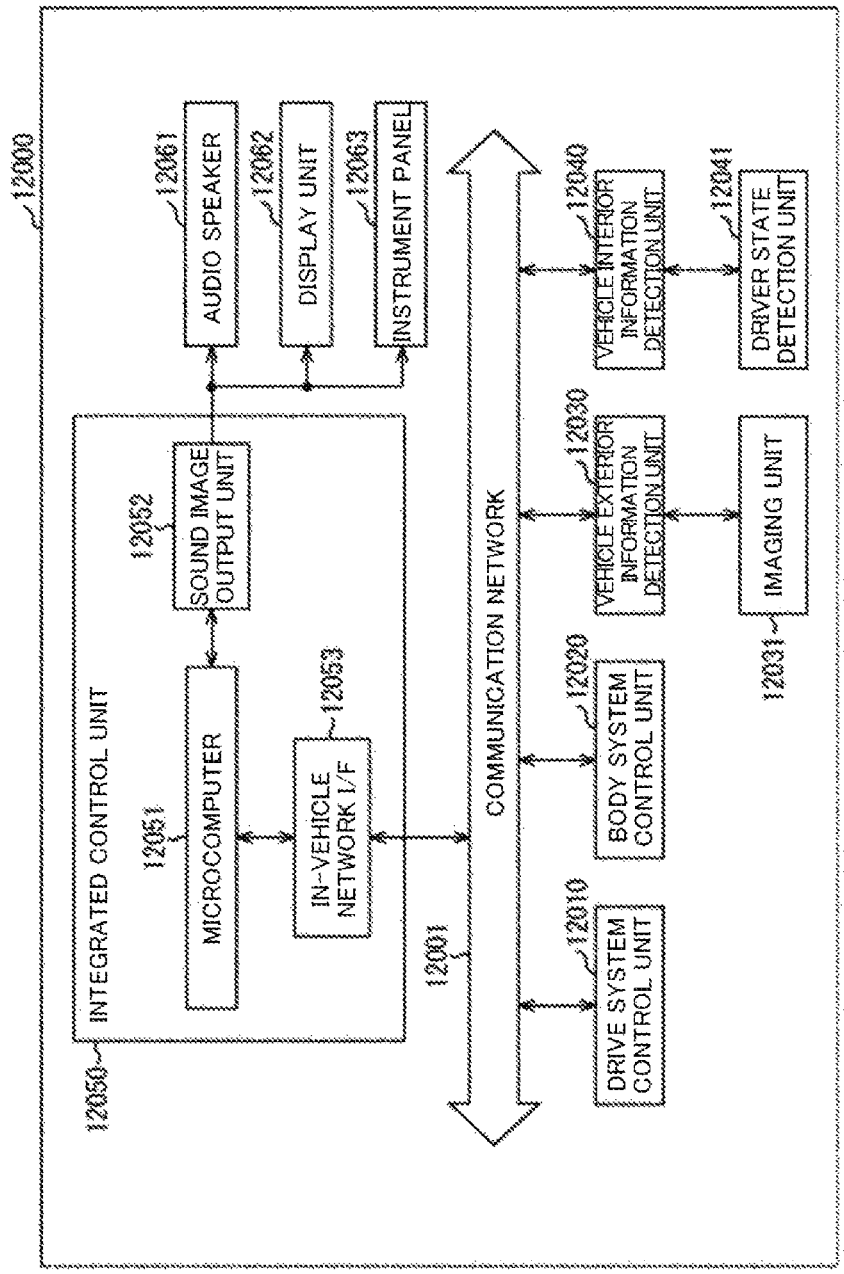
FIG. 16 is a block diagram illustrating a schematic configuration example of a vehicle control system which is an example of a moving body control system to which the technology according to the present disclosure can be applied.

FIG. 16 is a block diagram illustrating a schematic configuration example of a vehicle control system 12000 which is an example of a moving body control system to which the technology according to the present disclosure can be applied.

The vehicle control system 12000 includes a plurality of electronic control units connected via a communication network 12001. In the example illustrated in FIG. 16, the vehicle control system 12000 includes a drive system control unit 12010, a body system control unit 12020, a vehicle exterior information detection unit 12030, a vehicle interior information detection unit 12040, and an integrated control unit 12050. Also, a microcomputer 12051, a sound image output unit 12052, and an in-vehicle network interface (I/F) 12053 are included as functional configurations of the integrated control unit 12050 in the example illustrated in FIG. 16.

The drive system control unit 12010 controls operations of devices related to a drive system of a vehicle according to various programs. For example, the drive system control unit 12010 functions as a driving force generator for generating a driving force of a vehicle such as an internal combustion engine or a driving motor, a driving force transmission mechanism for transmitting a driving force to wheels, a steering mechanism for adjusting a turning angle of a vehicle, and a control device such as a braking device that generates a braking force of a vehicle.

The body system control unit 12020 controls operations of various devices mounted in the vehicle body according to various programs. For example, the body system control unit 12020 functions as a control device of a keyless entry system, a smart key system, a power window device, or various lamps such as a head lamp, a back lamp, a brake lamp, a turn signal, or a fog lamp. In this case, radio waves transmitted from a portable device that substitutes for a key or signals of various switches can be input to the body system control unit 12020. The body system control unit 12020 receives inputs of these radio waves or signals and controls a door lock device, a power window device, a lamp, and the like of the vehicle.

The vehicle exterior information detection unit 12030 detects information on the outside of the vehicle in which the vehicle control system 12000 is mounted. For example, an imaging unit 12031 is connected to the vehicle exterior information detection unit 12030. The vehicle exterior information detection unit 12030 causes the imaging unit 12031 to capture an image of the outside of the vehicle and receives the captured image. The vehicle exterior information detection unit 12030 may perform object detection processing or distance detection processing for persons, vehicles, obstacles, signs, or text on a road surface on the basis of the received image.

The imaging unit 12031 is an optical sensor that receives light and outputs an electrical signal corresponding to the amount of the received light. The imaging unit 12031 can also output the electrical signal as an image or as distance measurement information. In addition, light received by the imaging unit 12031 may be visible light, or may be invisible light such as infrared light.

The vehicle interior information detection unit 12040 detects information on the inside of the vehicle. For example, a driver state detection unit 12041 that detects a driver's state is connected to the vehicle interior information detection unit 12040. The driver state detection unit 12041 includes, for example, a camera that captures an image of a driver, and the vehicle interior information detection unit 12040 may calculate a degree of fatigue or concentration of the driver or may determine whether or not the driver is dozing on the basis of detection information input from the driver state detection unit 12041.

The microcomputer 12051 can calculate a control target value of the driving force generator, the steering mechanism, or the braking device on the basis of the information on the inside and the outside of the vehicle acquired by the vehicle exterior information detection unit 12030 or the vehicle interior information detection unit 12040, and output a control command to the drive system control unit 12010. For example, the microcomputer 12051 can perform coordinated control for the purpose of realizing a function of an advanced driver assistance system (ADAS) including vehicle collision avoidance, shock alleviation, following travel based on an inter-vehicle distance, cruise control, vehicle collision warning, vehicle lane departure warning, or the like.

Further, the microcomputer 12051 can perform cooperative control for the purpose of automated driving or the like in which autonomous travel is performed without depending on operations of the driver by controlling the driving force generator, the steering mechanism, the braking device, and the like on the basis of information regarding the surroundings of the vehicle acquired by the vehicle exterior information detection unit 12030 or the vehicle interior information detection unit 12040.

Furthermore, the microcomputer 12051 can output a control command to the body system control unit 12020 on the basis of the vehicle exterior information acquired by the vehicle exterior information detection unit 12030. For example, the microcomputer 12051 can perform cooperative control for the purpose of preventing glare, such as switching from a high beam to a low beam, by controlling the head lamp in accordance with the position of a preceding vehicle or an oncoming vehicle detected by the vehicle exterior information detection unit 12030.

The sound image output unit 12052 transmits an output signal of at least one of sound and an image to an output device capable of visually or audibly notifying an occupant of a vehicle or the outside of the vehicle of information. In the example of FIG. 16, an audio speaker 12061, a display unit 12062, and an instrument panel 12063 are illustrated as the output device. The display unit 12062 may include, for example, at least one of an on-board display and a heads-up display.

Figure 17:
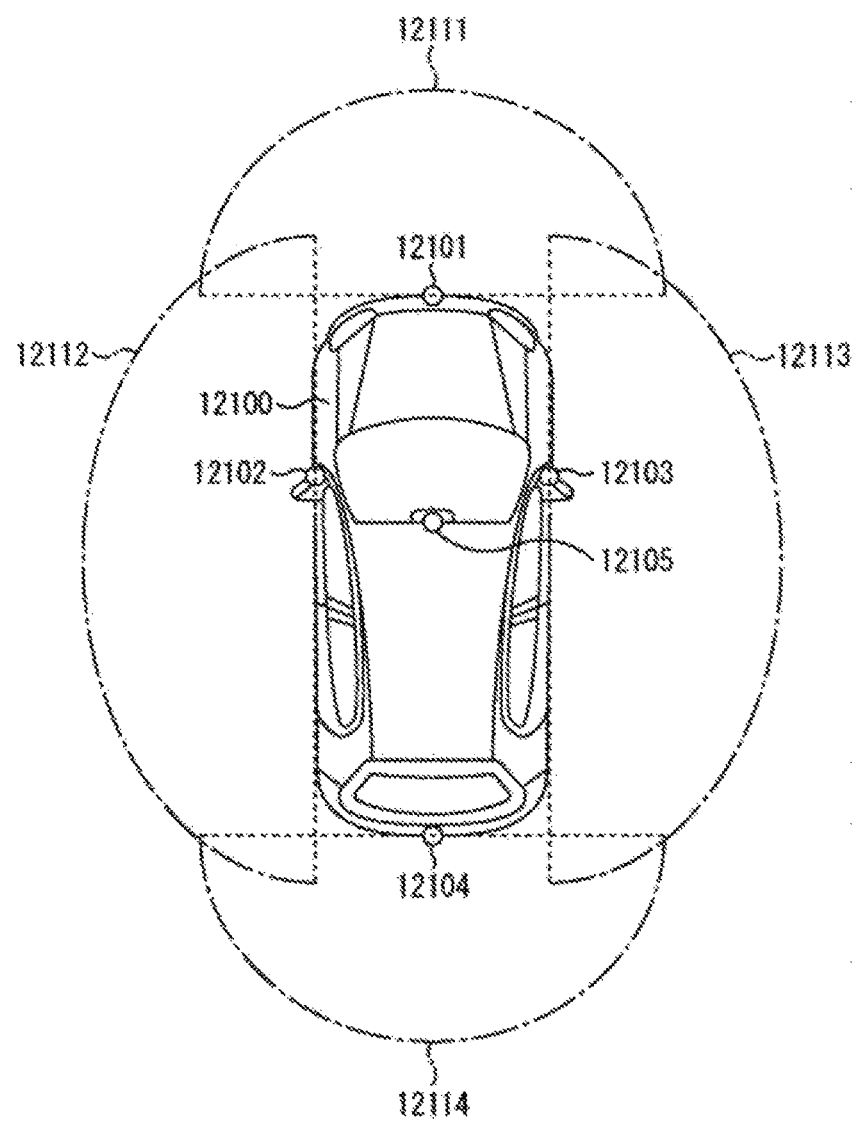
FIG. 17 is a diagram illustrating an example of an installation position of an imaging unit.

FIG. 17 is a diagram illustrating an example of the position at which the imaging unit 12031 is installed. In FIG. 17, imaging units 12101, 12102, 12103, 12104, and 12105 are included as the imaging unit 12031.

The imaging units 12101, 12102, 12103, 12104, and 12105 may be provided at positions such as a front nose, side-view mirrors, a rear bumper, a back door, and an upper part of a windshield in a vehicle interior of the vehicle 12100, for example. The imaging unit 12101 provided in the front nose and the imaging unit 12105 provided in the upper portion of the front glass inside the vehicle mainly acquire images on the front side of the vehicle 12100. The imaging units 12102 and 12103 provided in the side mirrors mainly acquire images on the lateral sides of the vehicle 12100. The imaging unit 12104 provided in the rear bumper or the backdoors mainly acquires images on the rear side of the vehicle 12100. The imaging unit 12105 included in the upper portion of the front glass inside the vehicle is mainly used to detect front vehicles or pedestrians, obstacles, traffic signals, traffic signs, lanes, and the like.

Note that an example of the imaging ranges of the imaging units 12101 to 12104 is illustrated by one-dotted chain lines in FIG. 17. An imaging range 12111 indicates an imaging range of the imaging unit 12101 provided at the front nose, imaging ranges 12112 and 12113 respectively indicate the imaging ranges of the imaging units 12102 and 12103 provided at the side-view mirrors, and an imaging range 12114 indicates the imaging range of the imaging unit 12104 provided at the rear bumper or the back door. For example, a bird's-eye view image of the vehicle 12100 as viewed from above can be obtained by superimposition of image data captured by the imaging units 12101 to 12104.

At least one of the imaging units 12101 to 12104 may have a function of obtaining distance information. For example, at least one of the imaging units 12101 to 12104 may be a stereo camera constituted by a plurality of imaging elements or may be an imaging element having pixels for phase difference detection.

For example, the microcomputer 12051 can extract a three-dimensional object traveling at a predetermined speed (for example, 0 km/h or more) in substantially the same direction as that of the vehicle 12100 which is particularly a closest three-dimensional object on a travel road of the vehicle 12100 as a preceding vehicle by obtaining a distance from each three-dimensional object within the imaging ranges 12111 to 12114 and a temporal change of the distance (a relative speed to the vehicle 12100) on the basis of the distance information obtained from the imaging units 12101 to 12104. Further, the microcomputer 12051 can set an inter-vehicle distance which is guaranteed in advance before a front vehicle and perform automated brake control (also including following stop control) or automated acceleration control (also including following start control). In this way, it is possible to perform the coordinated control for automated driving or the like in which autonomous travel is performed without an operation of a driver.

For example, the microcomputer 12051 can classify and extract three-dimensional object data regarding three-dimensional objects into two-wheeled vehicles, ordinary vehicles, large vehicles, pedestrians, and other three-dimensional objects such as utility poles on the basis of distance information obtained from the imaging units 12101 to 12104 and use the three-dimensional object data for automatic avoidance of obstacles. For example, the microcomputer 12051 classifies obstacles in the vicinity of the vehicle 12100 into obstacles that can be visually recognized by the driver of the vehicle 12100 and obstacles that are difficult to visually recognize. Then, the microcomputer 12051 can determine a risk of collision indicating the degree of risk of collision with each obstacle, and can perform driving assistance for collision avoidance by outputting a warning to a driver through the audio speaker 12061 or the display unit 12062 and performing forced deceleration or avoidance steering through the drive system control unit 12010 when the risk of collision has a value equal to or greater than a set value and there is a possibility of collision.

At least one of the imaging units 12101 to 12104 may be an infrared camera that detects infrared light. For example, the microcomputer 12051 can recognize a pedestrian by determining whether or not a pedestrian is present in images captured by the imaging units 12101 to 12104. Such recognition of a pedestrian is performed by, for example, a procedure of extracting a feature point in captured images of the imaging units 12101 to 12104 serving as infrared cameras, and a procedure of performing pattern matching processing on a series of feature points indicating the contour of an object to determine whether or not the object is a pedestrian. When the microcomputer 12051 determines that a pedestrian is present in the captured images of the imaging units 12101 to 12104 and recognizes the pedestrian, the sound image output unit 12052 controls the display unit 12062 such that a square contour line for emphasis is superimposed on the recognized pedestrian and is displayed. In addition, the sound image output unit 12052 may control the display unit 12062 so that an icon or the like indicating a pedestrian is displayed at a desired position.

The example of the vehicle control system to which the technology according to the present disclosure is applied has been described above. The technology according to the present disclosure can be applied to the imaging unit 12031 and the like in the above-described configuration. It is possible to reduce the sizes and the like of the imaging unit 12031 by applying the technology according to the present disclosure to the imaging unit 12031 and the like, and it thus becomes easy to design the interior and the exterior of the vehicle 12100. Also, it is possible to acquire a clear image with reduced noise by applying the technology according to the present disclosure to the imaging unit 12031 and the like and thereby to provide a captured image that can be more easily viewed to the driver. It is thus possible to reduce fatigue of the driver.

(Example of Application to Endoscopic Surgery System)

The technology according to the present disclosure (the present technology) can be applied to various products. For example, the technology according to the present disclosure may be applied to an endoscopic surgery system.

Figure 18:
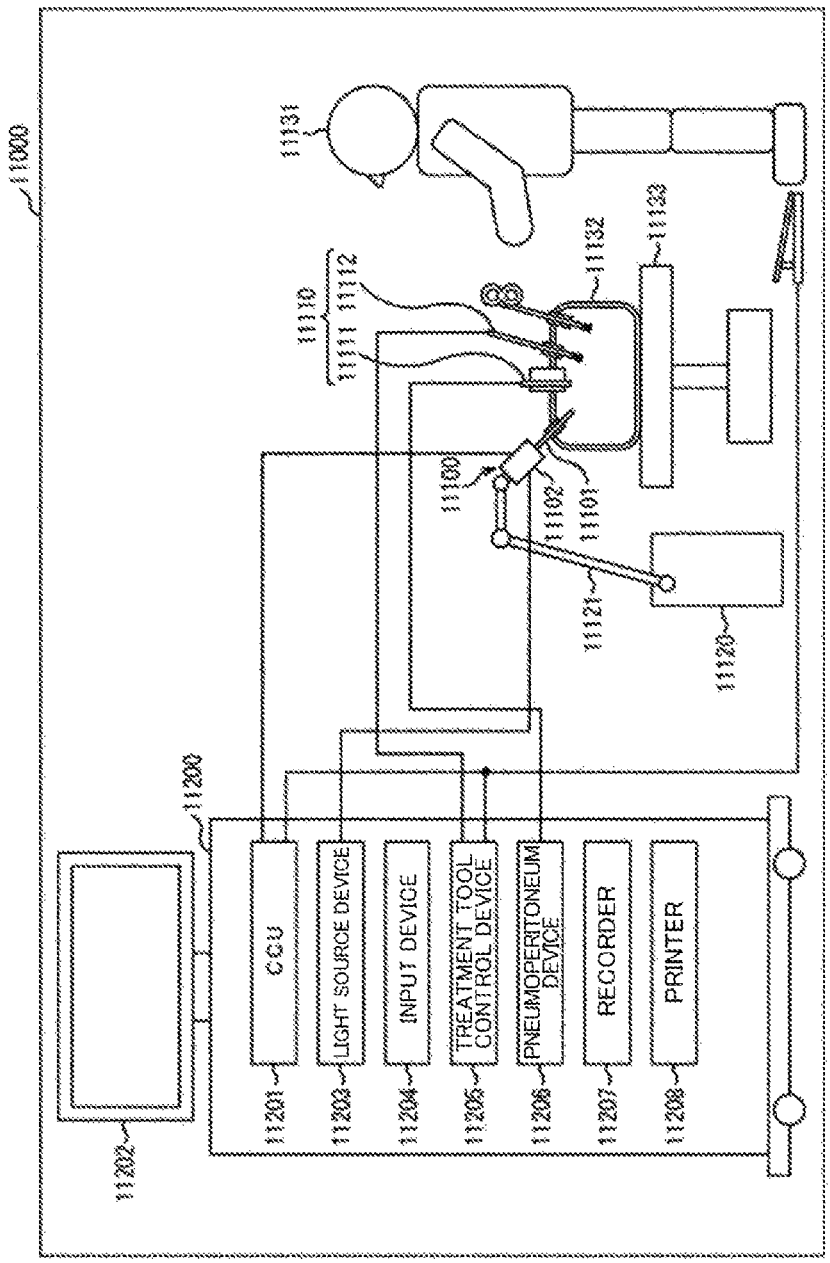
FIG. 18 is a diagram illustrating an example of a schematic configuration of an endoscopic surgery system to which the technology according to the present disclosure (the present technology) can be applied.

FIG. 18 is a diagram illustrating an example of a schematic configuration of an endoscopic surgery system to which the technology according to the present disclosure (the present technology) can be applied.

FIG. 18 shows a state where a surgeon (doctor) 11131 is performing a surgical operation on a patient 11132 on a patient bed 11133 by using the endoscopic surgery system 11000. As illustrated, the endoscopic surgery system 11000 includes an endoscope 11100, other surgical instruments 11110 such as a pneumoperitoneum tube 11111 and an energized treatment tool 11112, a support arm device 11120 that supports the endoscope 11100, and a cart 11200 equipped with various devices for endoscopic surgery.

The endoscope 11100 includes a lens barrel 11101, a region of which having a predetermined length from a distal end is inserted into a body cavity of the patient 11132, and a camera head 11102 connected to a proximal end of the lens barrel 11101. Although the endoscope 11100 configured as a so-called rigid mirror having the rigid lens barrel 11101 is illustrated in the illustrated example, the endoscope 11100 may be configured as a so-called flexible mirror having a flexible lens barrel.

An opening in which an objective lens is fitted is provided at the distal end of the lens barrel 11101. A light source device 11203 is connected to the endoscope 11100, and light generated by the light source device 11203 is guided to the distal end of the lens barrel by a light guide extending inside the lens barrel 11101 and is radiated toward the observation target in the body cavity of the patient 11132 via the objective lens. The endoscope 11100 may be a direct-viewing endoscope or may be a perspective endoscope or a side-viewing endoscope.

An optical system and an imaging element are provided inside the camera head 11102, and the reflected light (observation light) from the observation target is condensed on the imaging element by the optical system. The observation light is photoelectrically converted by the imaging element, and an electrical signal corresponding to the observation light, that is, an image signal corresponding to an observation image is generated. The image signal is transmitted to a camera control unit (CCU) 11201 as RAW data.

The CCU 11201 is constituted by a central processing unit (CPU), a graphics processing unit (GPU), and the like and integrally controls operations of the endoscope 11100 and a display device 11202. Further, the CCU 11201 receives the image signal from the camera head 11102 and performs various kinds of image processing such as development processing (demosaic processing) on the image signal for displaying an image based on the image signal.

The display device 11202 displays an image based on an image signal having been subjected to image processing by the CCU 11201 under the control of the CCU 11201.

The light source device 11203 is constituted by a light source such as a light emitting diode (LED) and supplies the endoscope 11100 with irradiation light for imaging a surgical site or the like.

An input device 11204 is an input interface for the endoscopic surgery system 11000. The user can input various types of information or instructions to the endoscopic surgery system 11000 via the input device 11204. For example, the user inputs an instruction to change imaging conditions (a type of irradiation light, a magnification, a focal length, or the like) of the endoscope 11100.

A treatment tool control device 11205 controls drive of the energized treatment tool 11112 for cauterizing or incising tissue, sealing a blood vessel, or the like. A pneumoperitoneum device 11206 sends gas into the body cavity through a pneumoperitoneum tube 11111 in order to inflate the body cavity of the patient 11132 for the purpose of securing a visual field for the endoscope 11100 and a working space for the surgeon. A recorder 11207 is a device capable of recording various information regarding surgery. A printer 11208 is a device that can print various types of information regarding surgery in various formats such as text, images, or graphs.

The light source device 11203 that supplies the endoscope 11100 with the irradiation light for imaging the surgical part can be constituted by, for example, an LED, a laser light source, or a white light source configured of a combination thereof. When a white light source is formed by a combination of RGB laser light sources, it is possible to control an output intensity and an output timing of each color (each wavelength) with high accuracy and thus, the light source device 11203 adjusts white balance of the captured image. Further, in this case, the observation target is time-divisionally irradiated with laser light from the respective RGB laser light sources, and driving of the imaging element of the camera head 11102 is controlled in synchronization with the irradiation timing, such that images corresponding to respective RGB can be captured in a time division manner. According to this method, it is possible to obtain a color image without providing a color filter to the imaging element.

Further, the driving of the light source device 11203 may be controlled to change the intensity of the output light at predetermined time intervals. It is possible to acquire images in a time-division manner by controlling the driving of the imaging element of the camera head 11102 in synchronization with a timing at which the intensity of the light is changed, and it is possible to generate a high dynamic range image without so-called blackout and whiteout by combining the images.

Further, the light source device 11203 may be configured to be able to supply light having a predetermined wavelength band corresponding to special light observation. In the special light observation, for example, so-called narrow band imaging in which a predetermined tissue such as a blood vessel of a mucosal surface layer is imaged with high contrast through irradiation with light in a narrower band than irradiation light (that is, white light) at the time of normal observation using a dependence of absorption of light in a body tissue on a wavelength is performed. Alternatively, in the special light observation, fluorescence observation in which an image is obtained using fluorescence generated through excitation light irradiation may be performed. In the fluorescence observation, it is possible to irradiate the body tissue with excitation light and observe the fluorescence from the body tissue (autofluorescence observation), to obtain a fluorescence image by locally injecting a reagent such as indocyanine green (ICG) into the body tissue and irradiating the body tissue with excitation light corresponding to the fluorescence wavelength of the reagent, or the like. The light source device 11203 may be configured to be able to supply the narrow band light and/or the excitation light corresponding to such special light observation.

Figure 19:
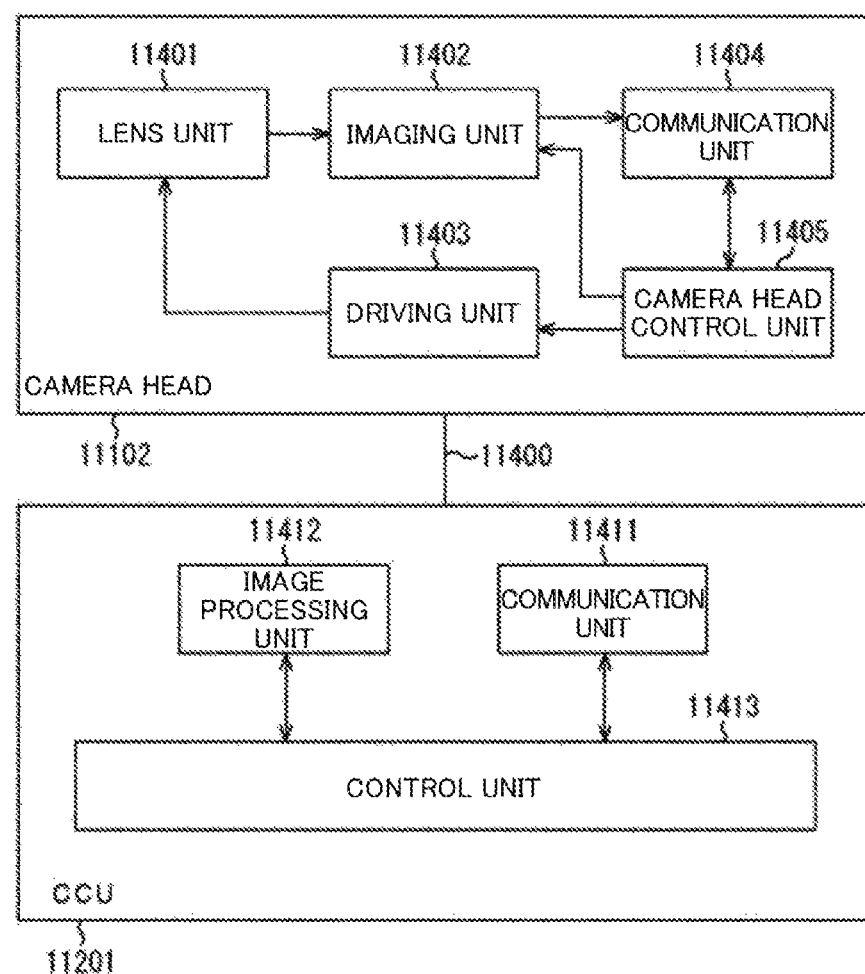
FIG. 19 is a block diagram illustrating an example of a functional configuration of a camera head and a CCU illustrated in FIG. 18.

FIG. 19 is a block diagram illustrating an example of a functional configuration of the camera head 11102 and CCU 11201 illustrated in FIG. 18.

The camera head 11102 includes a lens unit 11401, an imaging unit 11402, a driving unit 11403, a communication unit 11404, and a camera head control unit 11405. The CCU 11201 includes a communication unit 11411, an image processing unit 11412, and a control unit 11413. The camera head 11102 and the CCU 11201 are communicably connected to each other via a transmission cable 11400.

The lens unit 11401 is an optical system provided at a portion for connection to the lens barrel 11101. The observation light taken in from the distal end of the lens barrel 11101 is guided to the camera head 11102 and incident on the lens unit 11401. The lens unit 11401 is configured in combination of a plurality of lenses including a zoom lens and a focus lens.

The number of imaging elements constituting the imaging unit 11402 may be one (so-called single-plate type) or plural (so-called multi-plate type). In a case in which the imaging unit 11402 is configured as a multi-plate type, image signals corresponding to R, G, and B, for example, may be generated by the imaging elements and may be combined to obtain a color image. Alternatively, the imaging unit 11402 may be configured to include a pair of image sensors for respectively acquiring right-eye image signals and left-eye image signals corresponding to 3D (dimensional) display. By performing the 3D display, the surgeon 11131 can understand a depth of a living tissue in the operation site more accurately. Also, in a case in which the imaging unit 11402 is configured as the multi-plate type, a plurality of lens units 11401 may be provided corresponding to each image sensor.

Further, the imaging unit 11402 may not necessarily be provided in the camera head 11102. For example, the imaging unit 11402 may be provided immediately after the objective lens inside the lens barrel 11101.

The driving unit 11403 includes an actuator, and moves the zoom lens and the focus lens of the lens unit 11401 by a predetermined distance along an optical axis under the control of the camera head control unit 11405. Accordingly, the magnification and focus of the image captured by the imaging unit 11402 can be adjusted appropriately.

The communication unit 11404 is constituted by a communication device for transmitting and receiving various kinds of information to and from the CCU 11201. The communication unit 11404 transmits an image signal obtained from the imaging unit 11402 to the CCU 11201 through the transmission cable 11400 as RAW data.

The communication unit 11404 receives a control signal for controlling the driving of the camera head 11102 from the CCU 11201 and supplies the control signal to the camera head control unit 11405. The control signal includes, for example, information on the imaging conditions such as information indicating that the frame rate of the captured image is designated, information indicating that the exposure value at the time of imaging is designated, and/or information indicating that the magnification and the focus of the captured image are designated.

Note that the imaging conditions such as the frame rate, the exposure value, the magnification, and the focus described above may be appropriately designated by the user or may be automatically set by the control unit 11413 of the CCU 11201 on the basis of the acquired image signal. In the latter case, a so-called auto exposure (AE) function, an auto focus (AF) function, and an auto white balance (AWB) function are mounted in the endoscope 11100.

The camera head control unit 11405 controls the driving of the camera head 11102 on the basis of the control signal from the CCU 11201 received via the communication unit 11404.

The communication unit 11411 is constituted by a communication device for transmitting and receiving various kinds of information to and from the camera head 11102. The communication unit 11411 receives an image signal transmitted from the camera head 11102 via the transmission cable 11400.

In addition, the communication unit 11411 transmits a control signal for controlling the driving of the camera head 11102 to the camera head 11102. The image signal or the control signal can be transmitted by electric communication, optical communication, or the like.

The image processing unit 11412 performs various kinds of image processing on the image signal that is the RAW data transmitted from the camera head 11102.

The control unit 11413 performs various kinds of control regarding imaging of the surgical part or the like using the endoscope 11100 and a display of a captured image obtained by imaging the surgical part or the like. For example, the control unit 11413 generates the control signal for controlling the driving of the camera head 11102.

Further, the control unit 11413 causes the display device 11202 to display the captured image obtained by imaging the surgical part or the like on the basis of the image signal having subjected to the image processing by the image processing unit 11412. In this case, the control unit 11413 may recognize various objects in the captured image using various image recognition technologies. For example, the control unit 11413 can detect shapes and colors of edges of an object included in the captured image, thereby recognizing surgical instruments such as forceps, a specific living body part, bleeding, mist at the time of using the energized treatment tool 11112, and the like. The control unit 11413 may use the recognition results to superimpose and display various types of surgery support information on the image of the surgical site when the captured image is displayed on the display device 11202. By displaying the surgery support information in a superimposed manner and presenting it to the surgeon 11131, a burden on the surgeon 11131 can be reduced, and the surgeon 11131 can reliably proceed with the surgery.

The transmission cable 11400 that connects the camera head 11102 to the CCU 11201 is an electrical signal cable compatible with communication of an electrical signal, an optical fiber compatible with optical communication, or a composite cable thereof.

Here, in the illustrated example, wired communication is performed using the transmission cable 11400, but the communication between the camera head 11102 and the CCU 11201 may be performed wirelessly.

The example of the endoscopic surgery system to which the technology according to the present disclosure can be applied has been described above. The technology according to the present disclosure may be applied to the imaging unit 11402 of the camera head 11102, for example, among the configurations described above. By applying the technology according to the present disclosure to the camera head 11102, it is possible to reduce the sizes of the camera head 11102 and the like and thereby to obtain a compact size for the endoscopic surgery system 11000. Also, it is possible to acquire a clear image with reduced noise and to provide a captured image that can be more easily viewed to the surgeon by applying the technology according to the present disclosure to the camera head 11102 and the like. It is thus possible to reduce fatigue of the surgeon.

Here, although the endoscopic surgery system has been described as an example, the technology according to the present disclosure may be applied to other systems, for example, a microscopic surgery system.

(Example of Applications to Whole Slide Imaging (WSI) System)

The technology according to the present disclosure can be applied to various products. For example, the technology according to the present disclosure may be applied to a pathology diagnosis system, an assist system thereof, and the like (hereinafter, referred to as a diagnosis assist system) for observing cells and tissues collected by a doctor or the like from a patient and diagnosing lesions. The diagnosis assist system may be a whole slide imaging (WSI) system for diagnosing lesions on the basis of an image acquired using a digital pathology technology or assisting the diagnosis.

Figure 20:
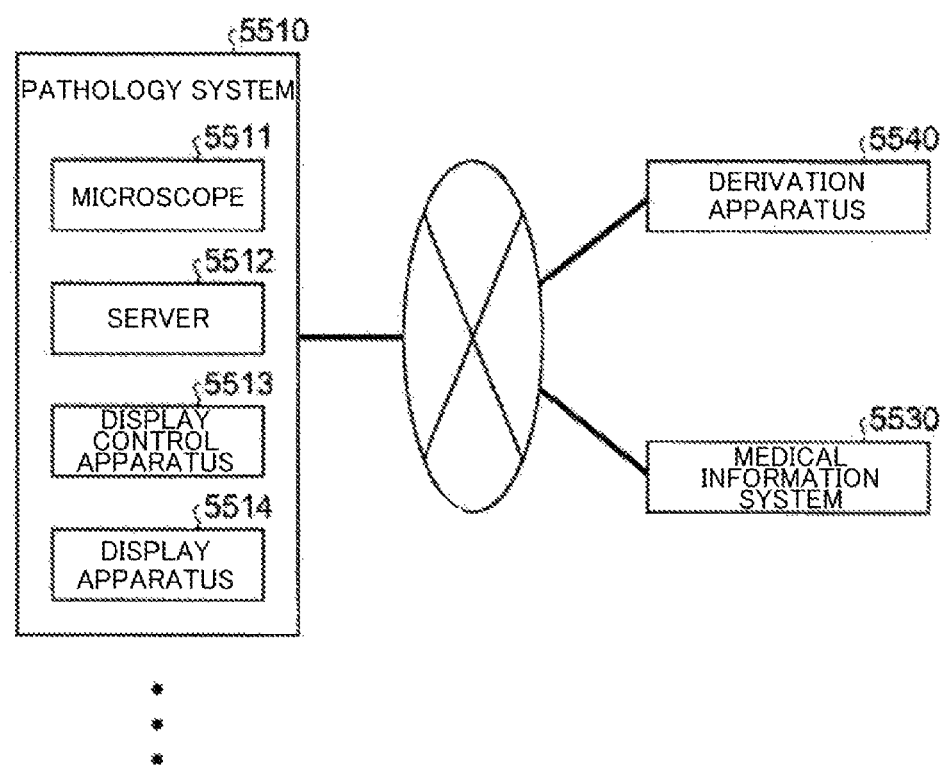
FIG. 20 is a diagram illustrating an example of a schematic configuration of a diagnosis assist system to which the technology according to the present disclosure can be applied.

FIG. 20 is a diagram illustrating an example of a schematic configuration of a diagnosis assist system 5500 to which the technology according to the present disclosure is applied. As illustrated in FIG. 20, the diagnosis assist system 5500 includes one or more pathology systems 5510. Moreover, a medical information system 5530 and a derivation apparatus 5540 may be included.

Each of the one or more pathology system 5510 is a system used mainly by pathologists and is introduced into a laboratory or a hospital, for example. Each pathology system 5510 may be introduced into a mutually different hospital and is connected to the medical information system 5530 and the derivation apparatus 5540 via various networks such as a wide area network (WAN) (including the Internet), a local area network (LAN), a public line network, and a mobile body communication network.

Each pathology system 5510 includes a microscope 5511, a server 5512, a display control apparatus 5513, and a display apparatus 5514.

The microscope 5511 has a function of an optical microscope, images an observation target stored in a glass slide, and acquires a pathology image that is a digital image. The observation target is, for example, a tissue or a cell collected from a patient and may be a piece of an organ, saliva, blood, or the like.

The server 5512 stores and saves the pathology image acquired by the microscope 5511 in a storage unit, which is not illustrated. Also, in a case in which a viewing request is received from the display control apparatus 5513, the server 5512 searches for the pathology image from the storage unit, which is not illustrated, and sends the searched pathology image to the display control apparatus 5513.

The display control apparatus 5513 sends, to the server 5512, the request for viewing the pathology image received from the user. Then, the display control apparatus 5513 causes the display apparatus 5514 using a liquid crystal, electro-luminescence (EL), a cathode ray tube (CRT), or the like to display the pathology image received from the server 5512. Note that the display apparatus 5514 may be compatible with 4K and 8K, the number of the display apparatuses 5514 is not limited to one, and a plurality of display apparatuses 5514 may be provided.

Here, in a case in which the observation target is a solid such as a piece of organ, the observation target may be a stained thin piece, for example. The thin piece may be produced by trimming a block piece, which has been cut from a specimen such as an organ, for example, into a thin piece. Also, the block piece may be secured with paraffin or the like at the time of trimming into the thin piece.

For the staining of the thin piece, various kinds of staining such as typical staining showing a tissue form, such as hematoxylin-eosin (HE) staining and immunostaining showing an immune state of a tissue, such as immunohistochemistry (IHC) staining, may be employed. At that time, one thin piece may be stained using a plurality of different reagents, or two or more thin pieces (also referred to adjacent thin pieces) continuously cut from the same block piece may be stained using mutually different reagents.

The microscope 5511 can include a low-resolution imaging unit for capturing an image with a low resolution and a high-resolution imaging unit for capturing an image with a high resolution. The low-resolution imaging unit and the high-resolution imaging unit may be different optical systems or may be the same optical system. In a case of the same optical system, the resolution of the microscope 5511 may be changed in accordance with an imaging target.

The glass slide in which the observation target is accommodated is placed on a stage located within an image angle of the microscope 5511. The microscope 5511 acquires the entire image within the image angle using the low-resolution imaging unit first and specifies a region of the observation target from the acquired entire image. Then, the microscope 5511 splits the region where the observation target is present into a plurality of split regions with a predetermined size and successively images each split region using the high-resolution imaging unit, thereby acquiring a high-resolution image of each split region. For switching the target split region, the stage may be moved, the imaging optical system may be moved, or both the stage and the imaging optical system may be moved. Also, in order to prevent occurrence of an imaging missing region or the like due to unintended sliding of the glass slide, each split region may overlap adjacent split regions. Moreover, the entire image may include identification information for associating a total of body images with a patient. The identification information may be, for example, a character sequence or a QR code (registered trademark).

The high-resolution images acquired by the microscope 5511 are input to the server 5512. The server 5512 splits each high-resolution image into partial images (hereinafter, referred to as tile images) with a smaller size. For example, the server 5512 splits one high-resolution image into 10×10 tile images in the vertical and horizontal directions, namely a total of 100 tile images. At that time, if adjacent split regions overlap each other, the server 5512 may perform stitching processing on the mutually adjacent high-resolution images using a technique such as template matching. In that case, the server 5512 may generate tile images by splitting the entire high-resolution image attached by the stitching processing. However, the tile images may be generated from the high-resolution images before the aforementioned stitching processing.

Also, the server 5512 can generate tile images with a yet smaller size by further splitting the tile images. Such generation of tile images may be repeated until tile images with a size set as a minimum unit are generated.

If the tile images as minimum units are generated in this manner, the server 5512 executes, on all the tile images, tile synthesis processing for generating one tile image by synthesizing a predetermined number of adjacent tile images. The tile synthesis processing can be repeated until one tile image is finally generated. A tile image group with a pyramid structure in which each hierarchy is constituted by one or more tile images is generated through such processing. Although the number of pixels in tile images in a certain layer is the same as the number of pixels in tile images in a layer that is different from the certain layer in the pyramid structure, resolutions thereof are different. In a case in which one tile image in a higher layer is generated by synthesizing 2×2, namely a total of four tile images, for example, the resolution of the tile image in the higher layer is ½ times the resolution of the tile images in a lower layer used for the synthesis.

It is possible to switch 37 levels of detail of the observation target displayed on the display apparatus depending on the hierarchy to which the tile images as targets of display belong, by constructing the tile image group with such a pyramid structure. For example, it is possible to display a narrow region of the observation target in more detail in a case in which tile images in the lowermost layer are used, and it is possible to more roughly display a wide region of the observation target in a case in which the tile images in the higher layer are used.

The generated tile image group with the pyramid structure is stored in the storage unit, which is not illustrated, along with identification information (referred to as tile identification information) with which each tile image can be uniquely identified, for example. In a case in which the server 5512 receives a request for acquiring tile images including the tile identification information from a different apparatus (for example, the display control apparatus 5513 or the derivation apparatus 5540), the server 5512 transmits the tile images corresponding to the tile identification information to the different apparatus.

Note that the tile image that is a pathology image may be generated for each of imaging conditions such as a focal point distance and a staining condition. In a case in which the tile images are generated for each imaging condition, another pathology image corresponding to an imaging condition that is different from a specific imaging condition in the same region as a specific pathology image may be displayed in an aligned manner along with the specific pathology image. The specific imaging condition may be designated by a viewer. Also, in a case in which the viewer designates a plurality of imaging conditions, pathology images in the same region corresponding to each of the imaging conditions may be displayed in an aligned manner.

Also, the server 5512 may store the tile image group with the pyramid structure in a storage device other than the server 5512, for example, a cloud server. Moreover, a part or entirety of the processing of generating the tile images as described above may be executed by the cloud server or the like.

The display control apparatus 5513 extracts a desired tile image from the tile image group with the pyramid structure and outputs the tile image to the display apparatus 5514 in response to an input operation of the user. The user can obtain a feeling of observing the observation target while changing the observation magnification ratio through such processing. In other words, the display control apparatus 5513 functions as a virtual microscope. The virtual observation magnification ratio here corresponds to a resolution in practice.

Note that any method may be used as a method for capturing the high-resolution image. The high-resolution image may be acquired by imaging the split regions while repeatedly stopping and moving the stage, or the high-resolution image on a strip may be acquired by imaging the split regions while moving the stage at a predetermine speed. Also, the processing of generating the tile images from the high-resolution image is not an essential configuration, and images with resolutions changing in a stepwise manner may be generated by changing the resolution of the entire high-resolution image attached through the stitching processing in a stepwise manner. It is possible to present a low-resolution image in a wide area to a high-resolution image in a narrow area to the user in a stepwise manner in this case as well.

The medical information system 5530 is a so-called electronic medical record system and stores information regarding diagnosis, such as information for identifying a patient, patient disease information, inspection information and image information used for diagnosis, diagnosis results, and prescription drugs. For example, a pathology image obtained by imaging an observation target of a certain patient can be once saved via the server 5512 and can be displayed on the display apparatus 5514 by the display control apparatus 5513. A pathologist using the pathology system 5510 performs pathological diagnosis on the basis of the pathology image displayed on the display apparatus 5514. A result of the pathologic diagnosis carried out by the pathologist is stored in the medical information system 5530.

The derivation apparatus 5540 can execute analysis of the pathology image. It is possible to use a learning model created through machine learning for the analysis. The derivation apparatus 5540 may derive a result of classifying a specific region, a result of identifying a tissue, and the like as a result of the analysis. Moreover, the derivation apparatus 5540 may derive identification results such as cell information, numbers, positions, and luminance information, scoring information thereof, and the like. The information derived by the derivation apparatus 5540 may be displayed as diagnosis assist information on the display apparatus 5514 in the pathology system 5510.

Note that the derivation apparatus 5540 may be a server system constituted by one or more servers (including cloud servers). Also, the derivation apparatus 5540 may be configured to be incorporated in the display control apparatus 5513 or the server 5512, for example, in the pathology system 5510. In other words, various kinds of analysis on the pathology image may be executed inside the pathology system 5510.

The technology according to the present disclosure can be suitably applied to the microscope 5511, for example, from among the configurations described above. Specifically, it is possible to apply the technology according to the present disclosure to the low-resolution imaging unit and/or the high-resolution imaging unit in the microscope 5511. It is possible to reduce the size of the low-resolution imaging unit and/or the high-resolution imaging unit and the size of the microscope 5511 by applying the technology according to the present disclosure to the low-resolution imaging unit and/or the high-resolution imaging unit. It thus becomes easy to carry the microscope 5511, and it is thus possible to facilitate system introduction, system rearrangement, and the like. Moreover, it is possible to execute a part or entirety of processing from acquisition of a pathology image to analysis of the pathology image in an on-the-fly manner inside the microscope 5511 by applying the technology according to the present disclosure to the low-resolution imaging unit and/or the high-resolution imaging unit, and it is thus possible to more quickly and appropriately output diagnosis assist information.

Note that the configuration described above is not limited to the diagnosis assist system and can be generally applied to biological microscopes such as a cofocal microscope, a fluorescent microscope, and a video microscope. Here, the observation target may be a biological sample such as a cultured cell, a fertilized egg, or a sperm, a biological material such as a cell sheet or a three-dimensional cell tissue, or a living body of a zebra fish, a mouse, or the like. Also, the observation target can also be observed not only in the glass slide but also in a state in which the observation target is stored in a well plate, a petri dish, or the like.

Moreover, a video may be generated from stationary images of the observation target acquired using the microscope. For example, the video may be generated from stationary images captured successively in a predetermined period of time, or an image sequence may be generated from stationary images captured at predetermined intervals. It is possible to analyze dynamic features of the observation target such as motions such as a beat, extension, and migration of cancer cells, nerve cells, myocardial tissues, sperms, and the like, division phases of cultured cells and fertilized eggs, and the like using machine learning by generating the video image from the stationary images.

The aforementioned embodiments may have the following forms.

(1)

An imaging apparatus including: a pixel array unit that includes a plurality of pixels performing photoelectric conversion; a converter that converts an analog pixel signal output from the pixel array unit into digital image data; an image processing unit that performs image processing on the digital image data; and storage unit that includes a plurality of regions for which a power distribution state is able to be selectively designated and stores at least the digital image data output by the image processing unit.

(2)

The imaging apparatus according to (1), in which the image processing unit executes processing of enlarging, reducing, or trimming the digital image data.

(3)

The imaging apparatus according to (1) or (2), wherein the image processing unit executes distortion correction processing for the digital image data.

(4)

The imaging apparatus according to any one of (1) to (3), further including: a control unit that switches the power distribution state for each of the regions in the storage unit.

(5)

The imaging apparatus according to (4), further including: an image rotation unit that acquires data obtained by rotating the digital image data stored in the storage unit, in which the storage unit further stores the digital image data output by the image rotation unit.

(6)

The imaging apparatus according to (5), in which the image rotation unit rotates the digital image data by a predetermined angle.

(7)

The imaging apparatus according to (5) or (6), further including: an inclination detection unit that detects an inclination of the pixel array unit, in which the image rotation unit acquires a rotation angle on the basis of an output of the inclination detection unit and rotates the digital image data on the basis of the rotation angle.

(8)

The imaging apparatus according to any one of (5) to (7), further including: an image recognition unit that performs recognition processing on the digital image data stored in the storage unit, in which the storage unit further stores output data of the image recognition unit.

(9)

The imaging apparatus according to (8), in which the image recognition unit performs recognition processing on the digital image data on the basis of a neural network model formed by a weight parameter trained in advance.

(10)

The imaging apparatus according to (9), in which the storage unit further stores the weight parameter.

(11)

The imaging apparatus according to (10), in which the storage unit includes at least one of the regions for storing the weight parameter.

(12)

The imaging apparatus according to any one of (9) to (11), further comprising: a training unit that trains the weight parameter on the basis of the recognition processing in the image recognition unit.

(13)

The imaging apparatus according to any one of (6) to (12), in which the control unit controls a region where the digital image data that is a target of processing is stored and a region where data after the processing is stored such that the regions are able to be referred to, from among the plurality of regions.

(14)

The imaging apparatus according to any one of (4) to (13), further including: a detection unit that detects a motion of the analog pixel signal acquired by the pixel array unit in the data processed by the image processing unit.

(15)

The imaging apparatus according to (14), in which the detection unit further performs face image recognition.

(16)

The imaging apparatus according to any one of (1) to (15), further including: a first substrate that includes the pixel array unit; and a second substrate that is laminated on the first substrate and includes the converter, the image processing unit, and the storage unit.

(17)

The imaging apparatus according to (16), in which the first substrate and the second substrate are attached by any of a chip-on-chip (CoC) scheme, a chip-on-wafer (CoW) scheme, and a wafer-on-wafer (WoW) scheme.

(18)

Electronic equipment including: an imaging apparatus that outputs captured image data; and a processor that performs predetermined signal processing on the image data, in which the imaging apparatus includes a pixel array unit that includes a plurality of pixels performing photoelectric conversion, a converter that converts an analog pixel signal output from the pixel array unit into digital image data, an image processing unit that performs image processing on the digital image data, a storage unit that includes a plurality of regions for which a power distribution state is able to be selectively designated and stores at least the digital image data output by the image processing unit, and a detection unit that detects a motion of the analog pixel signal acquired by the pixel array unit in the data processed by the image processing unit, and the processor provides, to the imaging apparatus, a notification regarding which of the regions in the storage unit the power distribution state is to be switched for in a case in which the detection unit detects a motion.

(19)

The electronic equipment according to (18), comprising: each component described in (2) to (17).

(20)

An imaging method including: by a pixel array that includes a plurality of pixels, performing photoelectric conversion: by a converter, converting an analog pixel signal output from the pixel array unit into digital image data; by an image processing unit, performing image processing on the digital image data; and by a storage unit that includes a plurality of regions for which a power distribution state is able to be selectively designated, storing at least the digital image data output by the image processing unit in a selectively designated region to which power is distributed.

(21)

The imaging method according to (20), further including: the steps executed by an imaging apparatus that arbitrarily includes each component described in (2) to (17).

Aspects of the present disclosure are not limited to the aforementioned individual embodiments and include various modifications that those skilled in the art can achieve, and effects of the present disclosure are also not limited to the details described above. In other words, various additions, modifications, and partial deletion can be made without departing from the conceptual idea and the gist of the present disclosure that can be derived from the details defined in the claims and the equivalents thereof.

Also, the present disclosure can also be applied to equipment that detects motions and performs recognition processing in the imaging apparatus 1, such as a monitoring camera, as well as the aforementioned moving body and the medical field.

REFERENCE SIGNS LIST

1 Imaging apparatus
10 CIS
100 Optical system
102 Pixel array unit
104 ADC
11 CPU
12 ISP
13 Detection unit
14 Rotation unit
15 DSP
16 Storage unit
17 SEL
18 Inclination detection unit
2 Electronic equipment
20 AP
30 First substrate
31 Second substrate

The invention claimed is:

1. An imaging apparatus, comprising:
a pixel array unit that includes a plurality of pixels, wherein the plurality of pixels is configured to:
execute photoelectric conversion; and
output an analog pixel signal based on the execution of the photoelectric conversion;
a converter configured to convert the outputted analog pixel signal into digital image data;
an image signal processor (ISP) configured to:
execute an image process on the digital image data; and
output processed digital image data based on the execution of the image process;
a memory that includes a plurality of regions, wherein
each region of the plurality of regions is associated with a power distribution state, and
the memory is configured to store the processed digital image data;
a central processing unit (CPU) configured to switch the power distribution state of each region of the plurality of regions;
an inclination detection unit configured to detect an inclination of the pixel array unit;
an image rotation unit configured to:
acquire a rotation angle based on the detected inclination of the pixel array unit;
acquire the stored digital image data based on the switch of the power distribution state; and
rotate the acquired digital image data based on the rotation angle, wherein the memory is further configured to store the rotated digital image data.

2. The imaging apparatus according to claim 1, wherein the ISP is further configured to execute, on the digital image data, at least one of an enlarging process, a reducing process, or a trimming process.

3. The imaging apparatus according to claim 1, wherein the ISP is further configured to execute a distortion correction process on the digital image data.

4. The imaging apparatus according to claim 1, wherein the image rotation unit is further configured to rotate the acquired digital image data by a determined angle.

5. The imaging apparatus according to claim 1, further comprising a digital signal processor (DSP) configured to:
execute a recognition process on the stored digital image data; and
output recognition data based on the execution of the recognition process, wherein the memory is further configured to store the outputted recognition.

6. The imaging apparatus according to claim 5, wherein the DSP is further configured to:
form a neural network model based on a trained weight parameter; and
execute the recognition process on the stored digital image data based on the formed neural network model.

7. The imaging apparatus according to claim 6, wherein the memory is further configured to store the trained weight parameter.

8. The imaging apparatus according to claim 7, wherein at least one region of the plurality of regions is configured to store the trained weight parameter.

9. The imaging apparatus according to claim 6, further comprising a training unit configured to re-train the trained weight parameter based on the execution of the recognition process.

10. The imaging apparatus according to claim 4, wherein
the plurality of regions includes a first region and a second region,
the first region is configured to store the processed digital image data,
the processed digital image data is a target for the rotation,
the second region is configured to store the rotated digital image data, and
the CPU is further configured to control each of the first region and the second region from the plurality of regions.

11. The imaging apparatus according to claim 1, further comprising a detection unit configured to detect a motion of the analog pixel signal based on the processed digital image data.

12. The imaging apparatus according to claim 11, wherein the detection unit is further configured to execute a face image recognition.

13. The imaging apparatus according to claim 1, further comprising:
a first substrate that includes the pixel array unit; and
a second substrate on the first substrate, wherein the second substrate includes each of the converter, the ISP, and the memory.

14. The imaging apparatus according to claim 13, wherein the first substrate and the second substrate are attached by at least one of a chip-on-chip (CoC) scheme, a chip-on-wafer (CoW) scheme, or a wafer-on-wafer (WoW) scheme.

15. Electronic equipment, comprising:
an imaging apparatus configured to output captured image data; and
a processor configured to execute a determined signal process on the captured image data, wherein
the imaging apparatus includes:
a pixel array unit that includes a plurality of pixels, wherein the plurality of pixels is configured to:
execute photoelectric conversion; and
output an analog pixel signal based on the execution of the photoelectric conversion;
a converter configured to convert the outputted analog pixel signal into digital image data;
an image signal processor (ISP) configured to:
execute an image process on the digital image data; and
output processed digital image data based on the execution of the image process;
a memory that includes a plurality of regions, wherein
each region of the plurality of regions is associated with a power distribution state that is selectively designated, and
the memory is configured to store the processed digital image data; and
a detection unit configured to detect a motion of the analog pixel signal based on the processed digital image,
the processor is further configured to transmit, to the imaging apparatus, a notification regarding a set of regions, of the plurality of regions, for which the power distribution state is to be switched, and
the transmission of the notification is based on the detected motion.

16. An imaging method, comprising:
executing, by a plurality of pixels of a pixel array, photoelectric conversion;
outputting, by the plurality of pixels, an analog pixel signal based on the execution of the photoelectric conversion;
converting, by a converter, the outputted analog pixel signal into digital image data;
executing, by an image signal processor (ISP), an image process on the digital image data;
outputting, by the ISP, processed digital image data based on the execution of the image process;
storing, by a memory, the processed digital image data, wherein
the memory includes a plurality of regions,
each region of the plurality of regions is associated with a power distribution state;
detecting, by an inclination detection unit, an inclination of the pixel array;
acquiring, by an image rotation unit, a rotation angle based on the detected inclination of the pixel array;
switching, by a central processing unit (CPU), the power distribution state of each region of the plurality of regions;
acquiring, by the image rotation unit, the stored digital image data based on the switch of the power distribution state;
rotating, by the image rotation unit, the acquired digital image data based on the rotation angle; and
storing, by the memory, the rotated digital image data.

* * * * *